United States Patent
Ly et al.

(10) Patent No.: US 11,689,973 B2
(45) Date of Patent: Jun. 27, 2023

(54) BANDWIDTH PART ACTIVATION IN HANDOVER WITH SUPPLEMENTARY LINKS

(71) Applicant: QUALCOMM Incorporated, San Diego, CA (US)

(72) Inventors: Hung Dinh Ly, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 17/247,143

(22) Filed: Dec. 1, 2020

(65) Prior Publication Data

US 2021/0185571 A1 Jun. 17, 2021

Related U.S. Application Data

(60) Provisional application No. 62/946,942, filed on Dec. 11, 2019.

(51) Int. Cl.
*H04W 36/00* (2009.01)
*H04W 36/08* (2009.01)

(52) U.S. Cl.
CPC ....... *H04W 36/0069* (2018.08); *H04W 36/08* (2013.01)

(58) Field of Classification Search
CPC ............. H04W 36/0069; H04W 36/08
See application file for complete search history.

(56) References Cited

U.S. PATENT DOCUMENTS

| 2020/0396654 A1* | 12/2020 | Freda | H04W 36/06 |
| 2021/0105673 A1* | 4/2021 | Jassal | H04W 36/0069 |
| 2022/0264680 A1* | 8/2022 | Kim | H04W 74/0833 |

* cited by examiner

*Primary Examiner* — Chi H Pham
*Assistant Examiner* — Ji-Hae Yea
(74) *Attorney, Agent, or Firm* — Arun Swain; Harrity & Harrity, LLP

(57) ABSTRACT

This disclosure provides systems, methods, and apparatuses for a user equipment (UE) to activate a bandwidth part (BWP) during a dual active protocol stack (DAPS) handover with a supplementary uplink (SUL). In one aspect, a base station may receive an indication that the UE supports DAPS handover. The base station may transmit a configuration or an instruction that indicates an active BWP for the UE to use for a target cell or target master cell group (MCG). In another aspect, the UE may transmit on a normal uplink (NUL) in an active BWP for a NUL carrier and transmit on a SUL in an active BWP for a SUL carrier. The UE may establish, in association with a DAPS handover being triggered, an active UL BWP that is within an active UL BWP for the NUL carrier or an active UL BWP for the SUL carrier.

30 Claims, 17 Drawing Sheets

BANDWIDTH PART ACTIVATION IN HANDOVER WITH SUPPLEMENTARY LINKS

CROSS-REFERENCE TO RELATED APPLICATION

This Patent Application claims priority to U.S. Provisional Patent Application No. 62/946,942, filed on Dec. 11, 2019, entitled "BANDWIDTH PART ACTIVATION IN HANDOVER WITH SUPPLEMENTAL LINKS," and assigned to the assignee hereof. The disclosure of the prior Application is considered part of and is incorporated by reference in this Patent Application.

TECHNICAL FIELD

Aspects of the present disclosure relate generally to wireless communication, and more particularly to techniques for bandwidth part activation in a dual active protocol stack handover with a supplementary uplink.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources, such as a bandwidth or a transmit power. Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, or a 5G NodeB.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication performed by a user equipment (UE). The method may include indicating support of a dual active protocol stack (DAPS) handover from a source cell or source master cell group (MCG) to a target cell or target MCG, transmitting on a normal uplink (NUL) to the source cell or source MCG in an active bandwidth part (BWP) for a NUL carrier, transmitting on a supplementary uplink (SUL) to the source cell or source MCG in an active BWP for a SUL carrier, and establishing, in association with the DAPS handover being triggered, an active uplink BWP on the target cell or target MCG that is within one or more of the active BWP for the SUL carrier or the active BWP for the NUL carrier.

In some implementations, establishing the active uplink BWP includes determining that the active uplink BWP on the target cell or target MCG is within the active BWP for the NUL carrier. In some implementations, the method may include switching, during the DAPS handover, the active uplink BWP on the source cell or source MCG from the active BWP for the NUL carrier to the active BWP for the SUL carrier. In some implementations, the method may include switching, during the DAPS handover, uplink transmission to the source cell or source MCG from the NUL carrier to the SUL carrier. In some implementations, the method may include determining that the UE is not configured to switch uplink transmission from the NUL carrier to the SUL carrier. In some implementations, the method includes determining that the UE is configured to switch uplink transmission from the NUL carrier to the SUL carrier and determining that the UE is not scheduled to switch, during the DAPS handover, uplink transmission from the NUL carrier to the SUL carrier. In some implementations, the method includes determining that the UE is configured to switch uplink transmission from the NUL carrier to the SUL carrier and maintaining, during the DAPS handover, uplink transmission on the NUL carrier.

In some implementations, establishing the active uplink BWP includes determining the active uplink BWP on the target cell or target MCG is within the active BWP for the SUL carrier. In some implementations, the method may include switching, during the DAPS handover, the active uplink BWP on the target cell or target MCG from within the active BWP for the SUL carrier to within the active BWP for the NUL carrier. In some implementations, the method may include switching, during the DAPS handover, uplink transmission to the source cell or source MCG from the SUL carrier to the NUL carrier. In some implementations, the method may include determining that the UE is not configured to switch uplink transmission from the SUL carrier to the NUL carrier. In some implementations, the method may include determining that the UE is configured to switch uplink transmission from the SUL carrier to the NUL carrier and determining that the UE is not scheduled to switch, during the DAPS handover, uplink transmission from the SUL carrier to the NUL carrier. In some implementations, the method includes determining that the UE is configured to switch uplink transmission from the SUL carrier to the NUL carrier and maintaining, during the DAPS handover, uplink transmission on the SUL carrier.

In some implementations, establishing the active uplink BWP includes determining that the active uplink BWP on the target cell or target MCG is within the active BWP for the NUL carrier based on a determination that the target cell is co-channel with the NUL carrier. In some implementations, establishing the active uplink BWP includes determining that the active uplink BWP on the target cell or target MCG is within the active BWP for the SUL carrier based on a determination that the target cell is co-channel with the SUL carrier. In some implementations, establishing the active uplink BWP is based on a configuration or instruction indicating the active uplink BWP on the target cell or target MCG is to be one of within the active BWP for the SUL carrier or within the active BWP for the NUL carrier.

In some implementations, the method may include simultaneously transmitting, during the DAPS handover, one or more communications on the NUL to the source cell or source MCG and one or more communications on a NUL to the target cell or target MCG. In some implementations, the method may include releasing, based on the DAPS handover being triggered, the SUL carrier to the source cell or source MCG. In some implementations, the releasing of the SUL carrier is based on receiving a release indication in a handover command or a dedicated radio resource control (RRC) message. In some implementations, the method may include establishing a SUL to the target cell or target MCG in the active uplink BWP that is within one or more of the active BWP for the SUL carrier or the active BWP for the NUL carrier. In some implementations, the method may include simultaneously transmitting, during the DAPS handover, one or more communications on the SUL to the source cell or source MCG and one or more communications on the SUL to the target cell or target MCG. In some implementations, the method may include refraining from simultaneously transmitting, during the DAPS handover, one or more communications on the SUL to the source cell or source MCG and one or more communications on the SUL to the target cell or target MCG. In some implementations, the method may include releasing, based on the DAPS handover being triggered, the NUL carrier to the source cell or source MCG. In some implementations, the releasing of the NUL carrier is based on receiving a release indication in a handover command or a dedicated RRC message.

Another innovative aspect of the subject matter described in this disclosure can be implemented in a UE for wireless communication. The UE may include memory and one or more processors operatively coupled to the memory. The memory and the one or more processors may be configured to indicate support of a DAPS handover from a source cell or source MCG to a target cell or target MCG, transmit on a NUL to the source cell or source MCG in an active BWP for a NUL carrier, transmit on a SUL to the source cell or source MCG in an active BWP for a SUL carrier, determine that the DAPS handover from the source cell or source MCG to the target cell or target MCG is triggered, and establish an active uplink BWP on the target cell or target MCG that is within one or more of the active BWP for the SUL carrier or the active BWP for the NUL carrier.

Another innovative aspect of the subject matter described in this disclosure can be implemented in an apparatus of a UE for wireless communication. In some implementations, the apparatus may include a first interface configured to: indicate support of a DAPS handover from a source cell or source MCG to a target cell or target MCG, transmit on NUL to the source cell or source MCG in an active BWP for a NUL carrier, and transmit on a SUL to the source cell or source MCG in an active BWP for a SUL carrier; and a processing system configured to establish, in association with the DAPS handover being triggered, an active uplink BWP on the target cell or target MCG that is within one or more of the active BWP for the SUL carrier or the active BWP for the NUL carrier.

In some implementations, the processing system is configured to determine that the active uplink BWP on the target cell or target MCG is within the active BWP for the NUL carrier. In some implementations, the processing system is configured to switch, during the DAPS handover, the active uplink BWP on the source cell or source MCG from the active BWP for the NUL carrier to the active BWP for the SUL carrier.

In some implementations, the processing system is configured to switch, during the DAPS handover, uplink transmission to the source cell or source MCG from the NUL carrier to the SUL carrier. In some implementations, the processing system is configured to determine that the UE is not configured to switch uplink transmission from the NUL carrier to the SUL carrier. In some implementations, the processing system is configured to determine that the UE is configured to switch uplink transmission from the NUL carrier to the SUL carrier, and that the UE is to maintain, during the DAPS handover, uplink transmission on the NUL carrier.

In some implementations, the processing system is configured to determine the active uplink BWP on the target cell or target MCG is within the active BWP for the SUL carrier. In some implementations, the processing system is configured to switch, during the DAPS handover, the active uplink BWP on the target cell or target MCG from within the active BWP for the SUL carrier to within the active BWP for the NUL carrier. In some implementations, the processing system is configured to switch, during the DAPS handover, uplink transmission to the source cell or source MCG from the SUL carrier to the NUL carrier.

In some implementations, the processing system is configured to determine that the UE is not configured to switch uplink transmission from the SUL carrier to the NUL carrier. In some implementations, the processing system is configured to determine that the UE is configured to switch uplink transmission from the SUL carrier to the NUL carrier, and that the UE is to maintain, during the DAPS handover, uplink transmission on the SUL carrier.

In some implementations, the processing system is configured to determine that the active uplink BWP on the target cell or target MCG is within the active BWP for the NUL carrier based on a determination that the target cell is co-channel with the NUL carrier. In some implementations, the processing system is configured to determine that the active uplink BWP on the target cell or target MCG is within the active BWP for the SUL carrier based on a determination that the target cell is co-channel with the SUL carrier. In some implementations, the processing system is configured to establish the active uplink BWP based on a configuration or instruction indicating the active uplink BWP on the target cell or target MCG is to be one of within the active BWP for the SUL carrier or within the active BWP for the NUL carrier.

In some implementations, the first interface is configured to simultaneously transmit, during the DAPS handover, one or more communications on the NUL to the source cell or source MCG and one or more communications on a NUL to the target cell or target MCG. In some implementations, the first interface is configured to release, based on the DAPS handover being triggered, the SUL carrier to the source cell or source MCG. In some implementations, the releasing of the SUL carrier is based on receiving a release indication in a handover command or a dedicated RRC message.

In some implementations, the processing system is configured to establish a SUL to the target cell or target MCG in the active uplink BWP that is within one or more of the active BWP for the SUL carrier or the active BWP for the NUL carrier. In some implementations, the first interface is configured to simultaneously transmit, during the DAPS handover, one or more communications on the SUL to the source cell or source MCG and one or more communications on the SUL to the target cell or target MCG. In some implementations, first interface is configured to refrain from simultaneously transmitting, during the DAPS handover, one or more communications on the SUL to the source cell or source MCG and one or more communications on the SUL to the target cell or target MCG. In some implementations, the first interface is configured to release, based on the DAPS handover being triggered, the NUL carrier to the source cell or source MCG. In some implementations, the releasing of the NUL carrier is based on receiving a release indication in a handover command or a dedicated RRC message.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to indicate support of a DAPS handover from a source cell or source MCG to a target cell or target MCG, transmit on a NUL to the source cell or source MCG in an active BWP for a NUL carrier, transmit on a SUL to the source cell or source MCG in an active BWP for a SUL carrier, and establish, in association with the DAPS handover being triggered, an active uplink BWP on the target cell or target MCG that is within one or more of the active BWP for the SUL carrier or the active BWP for the NUL carrier.

In some implementations, the one or more instructions, that cause the UE to establish the active uplink BWP, cause the UE to determine that the active uplink BWP on the target cell or target MCG is within the active BWP for the NUL carrier. In some implementations, the one or more instructions further cause the UE to switch, during the DAPS handover, the active uplink BWP on the source cell or source MCG from the active BWP for the NUL carrier to the active BWP for the SUL carrier.

In some implementations, the one or more instructions further cause the UE to switch, during the DAPS handover, uplink transmission to the source cell or source MCG from the NUL carrier to the SUL carrier. In some implementations, the one or more instructions further cause the UE to determine that the UE is not configured to switch uplink transmission from the NUL carrier to the SUL carrier. In some implementations, the one or more instructions further cause the UE to: determine that the UE is configured to switch uplink transmission from the NUL carrier to the SUL carrier; and maintain, during the DAPS handover, uplink transmission on the NUL carrier.

In some implementations, the one or more instructions, that cause the UE to establish the active uplink BWP, cause the UE to determine the active uplink BWP on the target cell or target MCG is within the active BWP for the SUL carrier. In some implementations, the one or more instructions further cause the UE to switch, during the DAPS handover, the active uplink BWP on the target cell or target MCG from within the active BWP for the SUL carrier to within the active BWP for the NUL carrier.

In some implementations, the one or more instructions further cause the UE to switch, during the DAPS handover, uplink transmission to the source cell or source MCG from the SUL carrier to the NUL carrier. In some implementations, the one or more instructions further cause the UE to determine that the UE is not configured to switch uplink transmission from the SUL carrier to the NUL carrier. In some implementations, the one or more instructions further cause the UE to: determine that the UE is configured to switch uplink transmission from the SUL carrier to the NUL carrier; and maintain, during the DAPS handover, uplink transmission on the SUL carrier.

In some implementations, the one or more instructions, that cause the UE to establish the active uplink BWP, cause the UE to determining that the active uplink BWP on the target cell or target MCG is within the active BWP for the NUL carrier based on a determination that the target cell is co-channel with the NUL carrier. In some implementations, the one or more instructions, that cause the UE to establish the active uplink BWP, cause the UE to determining that the active uplink BWP on the target cell or target MCG is within the active BWP for the SUL carrier based on a determination that the target cell is co-channel with the SUL carrier. In some implementations, establishing the active uplink BWP is based on a configuration or instruction indicating the active uplink BWP on the target cell or target MCG is to be one of within the active BWP for the SUL carrier or within the active BWP for the NUL carrier.

In some implementations, the one or more instructions further cause the UE to simultaneously transmit, during the DAPS handover, one or more communications on the NUL to the source cell or source MCG and one or more communications on a NUL to the target cell or target MCG. In some implementations, the one or more instructions further cause the UE to release, based on the DAPS handover being triggered, the SUL carrier to the source cell or source MCG. In some implementations, the releasing of the SUL carrier is based on receiving a release indication in a handover command or a dedicated RRC message.

In some implementations, the one or more instructions further cause the UE to establish a SUL to the target cell or target MCG in the active uplink BWP that is within one or more of the active BWP for the SUL carrier or the active BWP for the NUL carrier. In some implementations, the one or more instructions further cause the UE to simultaneously transmit, during the DAPS handover, one or more communications on the SUL to the source cell or source MCG and one or more communications on the SUL to the target cell or target MCG. In some implementations, the one or more instructions further cause the UE to refrain from simultaneously transmitting, during the DAPS handover, one or more communications on the SUL to the source cell or source MCG and one or more communications on the SUL to the target cell or target MCG. In some implementations, the one or more instructions further cause the UE to release, based on the DAPS handover being triggered, the NUL carrier to the source cell or source MCG. In some implementations, the releasing of the NUL carrier is based on receiving a release indication in a handover command or a dedicated RRC message.

Another innovative aspect of the subject matter described in this disclosure can be implemented in an apparatus for wireless communication. The apparatus may include means for indicating support of a DAPS handover from a source cell or source MCG to a target cell or target MCG, means for transmitting on a NUL to the source cell or source MCG in an active BWP for a NUL carrier, means for transmitting on a SUL to the source cell or source MCG in an active BWP for a SUL carrier, and means for establishing, in association with the DAPS handover being triggered, an active uplink BWP on the target cell or target MCG that is within one or more of the active BWP for the SUL carrier or the active BWP for the NUL carrier.

In some implementations, the means for establishing the active uplink BWP includes means for determining that the active uplink BWP on the target cell or target MCG is within the active BWP for the NUL carrier. In some implementations, the apparatus includes means for switching, during the DAPS handover, the active uplink BWP on the source cell or source MCG from the active BWP for the NUL carrier to the active BWP for the SUL carrier.

In some implementations, the apparatus includes means for switching, during the DAPS handover, uplink transmission to the source cell or source MCG from the NUL carrier to the SUL carrier. In some implementations, the apparatus includes means for determining that the UE is not configured to switch uplink transmission from the NUL carrier to the SUL carrier. In some implementations, the apparatus includes means for determining that the apparatus is configured to switch uplink transmission from the NUL carrier to the SUL carrier; and means for maintaining, during the DAPS handover, uplink transmission on the NUL carrier.

In some implementations, the means for establishing the active uplink BWP includes means for determining the active uplink BWP on the target cell or target MCG is within the active BWP for the SUL carrier. In some implementations, the apparatus includes means for switching, during the DAPS handover, the active uplink BWP on the target cell or target MCG from within the active BWP for the SUL carrier to within the active BWP for the NUL carrier.

In some implementations, the apparatus includes means for switching, during the DAPS handover, uplink transmission to the source cell or source MCG from the SUL carrier to the NUL carrier. In some implementations, the apparatus includes means for determining that the apparatus is not configured to switch uplink transmission from the SUL carrier to the NUL carrier. In some implementations, the apparatus includes means for determining that the apparatus is configured to switch uplink transmission from the SUL carrier to the NUL carrier; and means for maintaining, during the DAPS handover, uplink transmission on the SUL carrier.

In some implementations, the means for establishing the active uplink BWP includes means for determining that the active uplink BWP on the target cell or target MCG is within the active BWP for the NUL carrier based on a determination that the target cell is co-channel with the NUL carrier. In some implementations, the means for establishing the active uplink BWP includes means for determining that the active uplink BWP on the target cell or target MCG is within the active BWP for the SUL carrier based on a determination that the target cell is co-channel with the SUL carrier. In some implementations, establishing the active uplink BWP is based on a configuration or instruction indicating the active uplink BWP on the target cell or target MCG is to be one of within the active BWP for the SUL carrier or within the active BWP for the NUL carrier.

In some implementations, the apparatus includes means for simultaneously transmitting, during the DAPS handover, one or more communications on the NUL to the source cell or source MCG and one or more communications on a NUL to the target cell or target MCG.

In some implementations, the apparatus includes means for releasing, based on the DAPS handover being triggered, the SUL carrier to the source cell or source MCG. In some implementations, the releasing of the SUL carrier is based on receiving a release indication in a handover command or a dedicated RRC message. In some implementations, the apparatus includes means for establishing a SUL to the target cell or target MCG in the active uplink BWP that is within one or more of the active BWP for the SUL carrier or the active BWP for the NUL carrier.

In some implementations, the apparatus includes means for simultaneously transmitting, during the DAPS handover, one or more communications on the SUL to the source cell or source MCG and one or more communications on the SUL to the target cell or target MCG. In some implementations, the apparatus includes means for refraining from simultaneously transmitting, during the DAPS handover, one or more communications on the SUL to the source cell or source MCG and one or more communications on the SUL to the target cell or target MCG. In some implementations, the apparatus includes means for releasing, based on the DAPS handover being triggered, the NUL carrier to the source cell or source MCG. In some implementations, the releasing of the NUL carrier is based on receiving a release indication in a handover command or a dedicated RRC message.

One innovative aspect of the subject matter described in this disclosure can be implemented in a method of wireless communication performed by a base station. The method may include determining or receiving an indication that a UE supports DAPS handover for intra-frequency handover of the UE and determining or selecting, for the UE, an active uplink BWP to use for a target cell or a target MCG. The active uplink BWP may be within one or more of an active BWP for a SUL carrier for a source cell or source MCG or an active BWP for a NUL carrier for the source cell or source MCG. The method may include transmitting one or more of a configuration or an instruction indicating the active uplink BWP.

In some implementations, the active uplink BWP is within the active BWP for the NUL carrier. In some implementations, the active uplink BWP is within the active BWP for the SUL carrier.

In some implementations, the configuration is transmitted to the UE in an RRC configuration message. In some implementations, the instruction is transmitted in downlink control information (DCI). In some implementations, the method may include transmitting, in a handover command or a dedicated RRC message, an indication to release the SUL carrier to the source cell or source MCG based on the DAPS handover being triggered. In some implementations, the method may include transmitting, in a handover command or a dedicated RRC message, an indication to release the NUL carrier to the source cell or source MCG based on the DAPS handover being triggered. In some implementations, the one or more of a configuration or an instruction indicates that the UE is able to switch uplink transmission to the source cell or source MCG between the SUL carrier and the NUL carrier. In some implementations, the one or more of a configuration or an instruction indicates to the UE that the UE is not scheduled to switch, during the DAPS handover, uplink transmission between the SUL carrier and the NUL carrier. In some implementations, the configuration or the instruction indicates to the UE that the UE is to maintain, during the DAPS handover, uplink transmission on one of the SUL carrier or the NUL carrier. In some implementations, the one or more of a configuration or an instruction indicates that the UE is not able to switch uplink transmission between the SUL carrier and the NUL carrier.

Another innovative aspect of the subject matter described in this disclosure can be implemented in a base station for wireless communication. The base station may include memory and one or more processors operatively coupled to the memory. The memory and the one or more processors may be configured to determine that a UE supports DAPS handover for intra-frequency handover of the UE and determining, for the UE, an active uplink BWP to use for a target cell or a target MCG, the active uplink BWP being within one or more of an active BWP for a SUL carrier for a source cell or source MCG or an active BWP for a NUL carrier for the source cell or source MCG, and transmit one or more of a configuration or an instruction indicating the active uplink BWP.

Another innovative aspect of the subject matter described in this disclosure can be implemented in an apparatus of a base station for wireless communication. The apparatus may include a first interface configured to receive an indication that a UE supports DAPS handover for intra-frequency handover of the UE, a processing system configured to select, for the UE, an active uplink BWP to use for a target cell or a target MCG, the active uplink BWP being within one or more of an active BWP for a SUL carrier for a source cell or source MCG or an active BWP for a NUL carrier for the source cell or source MCG, and a second interface to transmit one or more of a configuration or an instruction indicating the active uplink BWP.

In some implementations, the active uplink BWP is within the active BWP for the NUL carrier. In some implementations, the active uplink BWP is within the active BWP for the SUL carrier. In some implementations, the configuration is transmitted to the UE in an RRC configuration message. In some implementations, the instruction is transmitted in DCI. In some implementations, the second interface is configured to transmit, in a handover command or a dedicated RRC message, an indication to release the SUL carrier to the source cell or source MCG based on the DAPS handover being triggered. In some implementations, the second interface is configured to transmit, in a handover command or a dedicated RRC message, an indication to release the NUL carrier to the source cell or source MCG based on the DAPS handover being triggered. In some implementations, the one or more of a configuration or an instruction indicates that the UE is able to switch uplink transmission to the source cell or source MCG between the SUL carrier and the NUL carrier and that the UE is to maintain, during the DAPS handover, uplink transmission on one of the SUL carrier or the NUL carrier. In some implementations, the one or more of a configuration or an instruction indicates that the UE is not able to switch uplink transmission between the SUL carrier and the NUL carrier.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a base station, may cause the one or more processors to determine or receive an indication that a UE supports DAPS handover for intra-frequency handover of the UE and determine or select, for the UE, an active uplink BWP to use for a target cell or a target MCG, the active uplink BWP being within one or more of an active BWP for a SUL carrier for a source cell or source MCG or an active BWP for a NUL carrier for the source cell or source MCG, and transmit one or more of a configuration or an instruction indicating the active uplink BWP.

In some implementations, the active uplink BWP is within the active BWP for the NUL carrier. In some implementations, the active uplink BWP is within the active BWP for the SUL carrier. In some implementations, the configuration is transmitted to the UE in an RRC configuration message. In some implementations, the instruction is transmitted in DCI. In some implementations, the one or more instructions further cause the base station to transmit, in a handover command or a dedicated RRC message, an indication to release the SUL carrier to the source cell or source MCG based on the DAPS handover being triggered. In some implementations, the one or more instructions further cause the base station to transmit, in a handover command or a dedicated RRC message, an indication to release the NUL carrier to the source cell or source MCG based on the DAPS handover being triggered. In some implementations, the one or more of a configuration or an instruction indicates that the UE is able to switch uplink transmission to the source cell or source MCG between the SUL carrier and the NUL carrier and that the UE is to maintain, during the DAPS handover, uplink transmission on one of the SUL carrier or the NUL carrier. In some implementations, the one or more of a configuration or an instruction indicates that the UE is not able to switch uplink transmission between the SUL carrier and the NUL carrier.

Another innovative aspect of the subject matter described in this disclosure can be implemented in an apparatus for wireless communication. The apparatus may include means for determining or receiving an indication that a UE supports DAPS handover for intra-frequency handover of the UE, means for determining or selecting, for the UE, an active uplink BWP to use for a target cell or a target MCG, the active uplink BWP being within one or more of an active BWP for a SUL carrier for a source cell or source MCG or an active BWP for a NUL carrier for the source cell or source MCG, and means for transmitting one or more of a configuration or an instruction indicating the active uplink BWP.

In some implementations, the active uplink BWP is within the active BWP for the NUL carrier. In some implementations, the active uplink BWP is within the active BWP for the SUL carrier. In some implementations, the configuration is transmitted to the UE in an RRC configuration message. In some implementations, the instruction is transmitted in DCI. In some implementations, the apparatus includes means for transmitting, in a handover command or a dedicated RRC message, an indication to release the SUL carrier to the source cell or source MCG based on the DAPS handover being triggered. In some implementations, the apparatus includes means for transmitting, in a handover command or a dedicated RRC message, an indication to release the NUL carrier to the source cell or source MCG based on the DAPS handover being triggered. In some implementations, the one or more of a configuration or an instruction indicates that the UE is able to switch uplink transmission to the source cell or source MCG between the SUL carrier and the NUL carrier and that the UE is to maintain, during the DAPS handover, uplink transmission on one of the SUL carrier or the NUL carrier. In some implementations, the one or more of a configuration or an instruction indicates that the UE is not able to switch uplink transmission between the SUL carrier and the NUL carrier.

One innovative aspect of the subject matter described in this disclosure can be implemented in a method of wireless communication performed by a UE. The method may include indicating support of a DAPS handover from a source cell or source MCG to a target cell or target MCG, transmitting to the source cell or source MCG on a first uplink carrier, determining that the DAPS handover from the source cell or source MCG to the target cell or target MCG is triggered and one of: switching, during the DAPS handover, uplink transmission (to the source cell or source MCG or to the target cell or target MCG) from the first uplink carrier to a second uplink carrier, one of the first uplink carrier or the second uplink carrier being a supplementary carrier, and determining, in association with the DAPS handover being triggered, that the UE is not scheduled to switch, during the DAPS handover, uplink transmission from the first uplink carrier to the second uplink carrier, or determining that the UE is not configured to switch uplink transmission from the first uplink carrier to the second uplink carrier. The UE may maintain, during the DAPS handover, uplink transmission on the first uplink carrier.

In some implementations, the first carrier is a normal uplink carrier and the second carrier is a supplementary uplink carrier. In some implementations, the second carrier is a normal uplink carrier and the first carrier is a supplementary uplink carrier. In some implementations, the method may include determining that the UE is not configured to switch uplink transmission from the first uplink carrier to the second uplink carrier.

Another innovative aspect of the subject matter described in this disclosure can be implemented in a UE for wireless communication. The UE may include memory and one or more processors operatively coupled to the memory. The memory and the one or more processors may be configured to indicate support of a DAPS handover from a source cell or source MCG to a target cell or target MCG, transmit to the source cell or source MCG on a first uplink carrier, determine that the DAPS handover from the source cell or source MCG to the target cell or target MCG is triggered and one of: switch, during the DAPS handover, uplink transmission to the source cell or source MCG from the first uplink carrier to a second uplink carrier, one of the first uplink carrier or the second uplink carrier being a supplementary carrier, and determine, in association with the DAPS handover being triggered, that the UE is not scheduled to switch, during the DAPS handover, uplink transmission from the first uplink carrier to the second uplink carrier or is to maintain, during the DAPS handover, uplink transmission on the first uplink carrier, or determine that the UE is not configured to switch uplink transmission from the first uplink carrier to the second uplink carrier. The UE may maintain, during the DAPS handover, uplink transmission on the first uplink carrier. Another innovative aspect of the subject matter described in this disclosure can be implemented in an apparatus of a UE for wireless communication. The apparatus may include a first interface configured to indicate support of a DAPS handover from a source cell or source MCG to a target cell or target MCG, a second interface configured to transmit to the source cell or source MCG on a first uplink carrier, a processing system configured to determine, in association with the DAPS handover being triggered, that the UE is configured to switch uplink transmission from the first uplink carrier to the second uplink carrier, and that the UE is to maintain, during the DAPS handover, uplink transmission on the first uplink carrier. The processing system may be configured to maintain, during the DAPS handover, uplink transmission on the first uplink carrier.

In some implementations, the first carrier is a NUL carrier and the second carrier is a SUL carrier. In some implementations, the second carrier is a NUL carrier and the first carrier is a SUL carrier. In some implementations, the processing system is configured to determine that the UE is not configured to switch uplink transmission from the first uplink carrier to the second uplink carrier.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to indicate support of a DAPS handover from a source cell or source MCG to a target cell or target MCG, transmit to the source cell or source MCG on a first uplink carrier, determine that the DAPS handover from the source cell or source MCG to the target cell or target MCG is triggered and one of: switch, during the DAPS handover, uplink transmission to the source cell or source MCG from the first uplink carrier to a second uplink carrier, one of the first uplink carrier or the second uplink carrier being a supplementary carrier, determine that the UE is configured to switch uplink transmission from the first uplink carrier to the second uplink carrier, and determine that the UE is not scheduled to switch, during the DAPS handover, uplink transmission from the first uplink carrier to the second uplink carrier or is to maintain, during the DAPS handover, uplink transmission on the first uplink carrier, or determine that the UE is not configured to switch uplink transmission from the first uplink carrier to the second uplink carrier. The UE may maintain, during the DAPS handover, uplink transmission on the first uplink carrier.

In some implementations, the first carrier is a NUL carrier and the second carrier is a SUL carrier. In some implementations, the second carrier is a NUL carrier and the first carrier is a SUL carrier. In some implementations, the one or more instructions further cause the UE to determine that the UE is not configured to switch uplink transmission from the first uplink carrier to the second uplink carrier.

Another innovative aspect of the subject matter described in this disclosure can be implemented in an apparatus for wireless communication. The apparatus may include means for indicating support of a DAPS handover from a source cell or source MCG to a target cell or target MCG, means for transmitting to the source cell or source MCG on a first uplink carrier, means for determining that the DAPS handover from the source cell or source MCG to the target cell or target MCG is triggered and means for one of: switching, during the DAPS handover, uplink transmission to the source cell or source MCG from the first uplink carrier to a second uplink carrier, one of the first uplink carrier or the second uplink carrier being a supplementary carrier, determining that the UE is configured to switch uplink transmission from the first uplink carrier to the second uplink carrier, and determining that the UE is not scheduled to switch, during the DAPS handover, uplink transmission from the first uplink carrier to the second uplink carrier or is to maintain, during the DAPS handover, uplink transmission on the first uplink carrier, or determining that the UE is not configured to switch uplink transmission from the first uplink carrier to the second uplink carrier. The UE may maintain, during the DAPS handover, uplink transmission on the first uplink carrier.

In some implementations, the first carrier is a NUL carrier and the second carrier is a SUL carrier. In some implementations, the second carrier is a NUL carrier and the first carrier is a SUL carrier. In some implementations, the apparatus includes means for determining that the UE is not configured to switch uplink transmission from the first uplink carrier to the second uplink carrier.

One innovative aspect of the subject matter described in this disclosure can be implemented in a method of wireless communication performed by a base station. The method may include determining or receiving an indication that a UE supports DAPS handover for intra-frequency handover of the UE, determining or generating one or more of a configuration or an instruction for a UE related to switching, during the DAPS handover, uplink transmission to a source cell or source MCG from a first uplink carrier to a second uplink carrier, and transmitting the one or more of a configuration or an instruction that the UE is able to switch uplink transmission to the source cell or source MCG between the first carrier and the second carrier and that the UE is to maintain, during the DAPS handover, uplink transmission on the first carrier.

In some implementations, the one or more of a configuration or an instruction indicates that the UE is able to switch uplink transmission to the source cell or source MCG between the first carrier and the second carrier. In some implementations, the one or more of a configuration or an instruction indicates to the UE that the UE is not scheduled to switch, during the DAPS handover, uplink transmission between the first carrier and the second carrier. The configuration or the instruction may indicate that the UE is to maintain uplink transmission on the first carrier.

In some implementations, the one or more of a configuration or an instruction indicates that the UE is able to switch uplink transmission to the target cell or target MCG between the first carrier and the second carrier. In some implementations, the one or more of a configuration or an instruction indicates to the UE that the UE is not scheduled to switch, during the DAPS handover, uplink transmission between the first carrier and the second carrier. The configuration or the instruction may indicate that the UE is to maintain, during the DAPS handover, uplink transmission on the first carrier. In some implementations, the one or more of a configuration or an instruction indicates that the UE is not able to switch uplink transmission between the first carrier and the second carrier. In some implementations, the first carrier is a normal uplink carrier and the second carrier is a supplementary uplink carrier. In some implementations, the second carrier is a normal uplink carrier and the first carrier is a supplementary uplink carrier.

Another innovative aspect of the subject matter described in this disclosure can be implemented in an apparatus of a base station for wireless communication. The apparatus may include a processing system configured to determine or receive an indication that a UE supports DAPS handover for intra-frequency handover of the UE, the processing system configured to determine or generate one or more of a configuration or an instruction for a UE related to switching, during the DAPS handover, uplink transmission to a source cell or source MCG from a first uplink carrier to a second uplink carrier, and a first interface configured to transmit the one or more of a configuration or an instruction that the UE is able to switch uplink transmission to the source cell or source MCG between the first carrier and the second carrier and that the UE is to maintain, during the DAPS handover, uplink transmission on the first carrier.

In some implementations, the one or more of a configuration or an instruction indicates that the UE is able to switch uplink transmission to the target cell or target MCG between the first carrier and the second carrier. In some implementations, the one or more of a configuration or an instruction indicates that the UE is not able to switch uplink transmission between the first carrier and the second carrier. In some implementations, the first carrier is a NUL carrier and the second carrier is a SUL carrier. In some implementations, the second carrier is a NUL carrier and the first carrier is a SUL carrier.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a base station, may cause the one or more processors to determine or receive an indication that a UE supports DAPS handover for intra-frequency handover of the UE and determining or generating, for the UE, an active uplink BWP to use for a target cell or a target MCG, the active uplink BWP being within one or more of an active BWP for a SUL carrier for a source cell or source MCG or an active BWP for a NUL carrier for the source cell or source MCG, and transmit one or more of a configuration or an instruction indicating the active uplink BWP.

In some implementations, the one or more of a configuration or an instruction indicates that the UE is able to switch uplink transmission to the target cell or target MCG between the first carrier and the second carrier. In some implementations, the one or more of a configuration or an instruction indicates that the UE is not able to switch uplink transmission between the first carrier and the second carrier. In some implementations, the first carrier is a NUL carrier and the second carrier is a SUL carrier. In some implementations, the second carrier is a NUL carrier and the first carrier is a SUL carrier.

Another innovative aspect of the subject matter described in this disclosure can be implemented in an apparatus for wireless communication. The apparatus may include means for determining or receiving an indication that a UE supports DAPS handover for intra-frequency handover of the UE, means for determining or generating one or more of a configuration or an instruction for a UE related to switching, during the DAPS handover, uplink transmission to a source cell or source MCG from a first uplink carrier to a second uplink carrier, and means for transmitting the one or more of a configuration or an instruction that the UE is able to switch uplink transmission to the source cell or source MCG between the first carrier and the second carrier and that the UE is to maintain, during the DAPS handover, uplink transmission on the first carrier.

In some implementations, the one or more of a configuration or an instruction indicates that the UE is able to switch uplink transmission to the target cell or target MCG between the first carrier and the second carrier. In some implementations, the one or more of a configuration or an instruction indicates that the UE is not able to switch uplink transmission between the first carrier and the second carrier. In some implementations, the first carrier is a NUL carrier and the second carrier is a SUL carrier. In some implementations, the second carrier is a NUL carrier and the first carrier is a SUL carrier.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
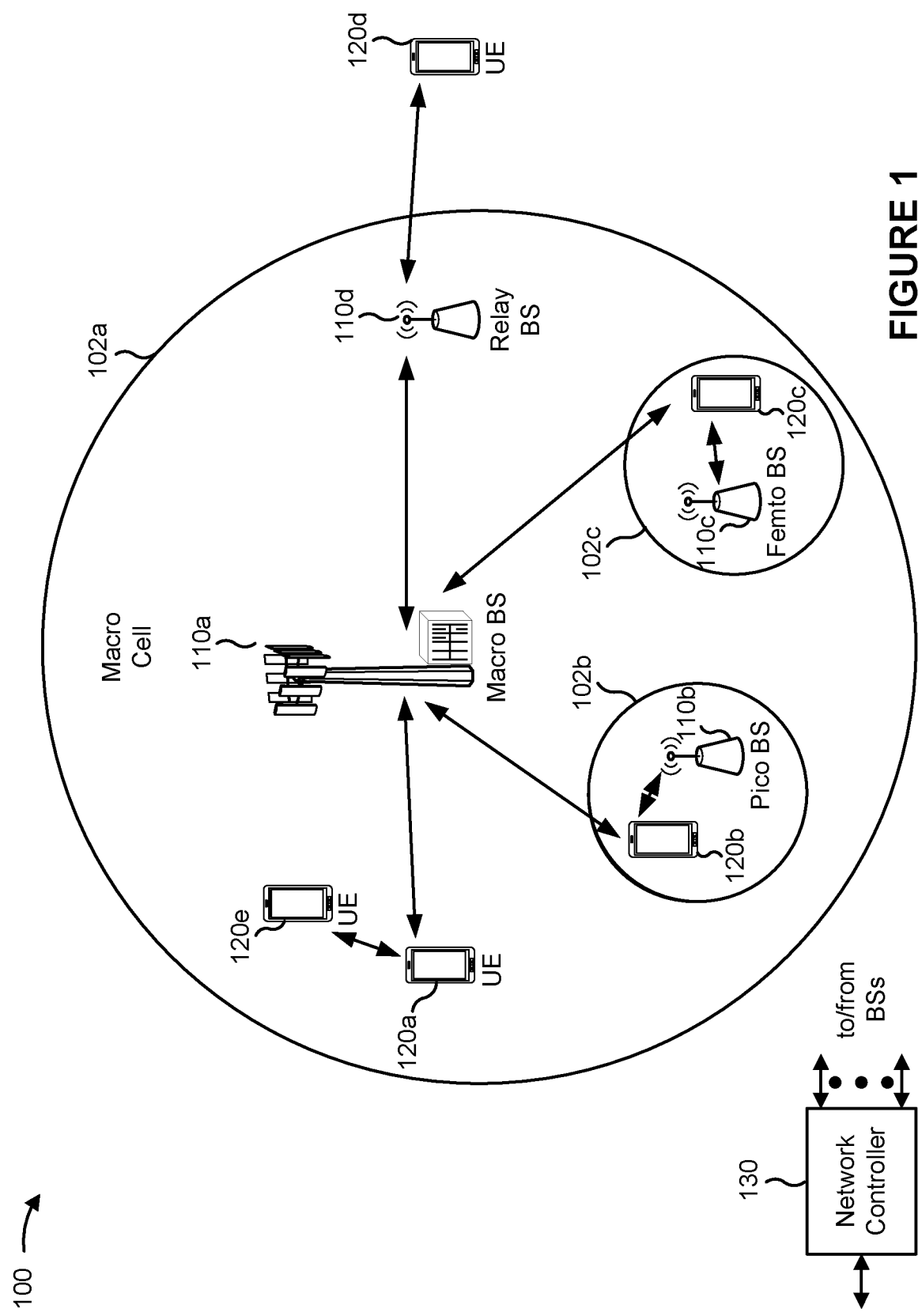
FIG. 1 is a block diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

UE mobility may involve a UE moving from a source cell, such as a source base station, to a target cell, such as a target base station. Accordingly, a connection of the UE may be moved from the source cell to the target cell with a procedure called a handover. While an interruption in service may occur when the handover is performed, enhancements to UE mobility may mitigate such interruptions. One mobility enhancement is a dual active protocol stack (DAPS) handover. A DAPS handover may reduce or eliminate an interruption in service during the handover. The interruption may be reduced because a UE may keep both a source connection to the source cell and a target connection to the target cell during the handover. This type of handover may be considered a make-before-break (MBB) handover. The handover may also involve a source master cell group (MCG) or a target MCG. An MCG may be, in a scenario of dual connectivity, a group of serving cells associated with a master radio access network node.

A UE may be active on a frequency bandwidth for data transmission. To reduce power consumption, a UE may be active on a narrower bandwidth. The narrower bandwidth may be a subset of contiguous resource blocks (RBs) on a frequency carrier, where an RB includes 12 consecutive subcarriers. The narrower bandwidth may be a bandwidth part (BWP). Up to four BWPs may be configured in the UE for each of the uplink (UL) and downlink (DL) directions, and one BWP may be active per transmission direction.

A UE may establish and transmit uplink transmissions on a normal uplink (NUL) to a source cell or source MCG in an active BWP for a NUL carrier. For a DAPS handover, the UE may expect that an active UL BWP for the NUL to a target cell or target MCG is confined with an active UL BWP for the NUL to the source cell or source MCG. However, the UE also may be transmitting to the source cell or source MCG on a supplementary uplink (SUL) of a SUL carrier, in addition to the NUL. The UE that is transmitting on both the NUL and the SUL to the source cell or source MCG may be handed over in the DAPS handover. The DAPS handover process is still developing with respect to SUL operation. The UE may not be configured or instructed as to what UL BWP to use for a NUL to the target cell or target MCG. For example, the UE may not have been configured or instructed to use an active BWP for the SUL carrier or to use an active BWP for the NUL carrier. Without such clarity, the UE may transmit to the target cell or target MCG in a wrong UL BWP. In some implementations, this will result in an interruption in service, poor service, latency, or additional processing. Additionally, signaling resources may be used to reestablish a connection back to the source cell or to another cell using an expected active BWP.

In various aspects described herein, a UE may establish an active UL BWP of a target cell or target MCG that is within an active UL BWP for a NUL carrier or an active UL BWP for a SUL carrier of the source cell or the source MCG. In some aspects, a base station may configure or instruct the UE to use, for a NUL to a target cell or target MCG, an active UL BWP used for a NUL carrier. In some aspects, the base station may configure or instruct the UE to use an active UL BWP for the SUL carrier. In this way, the UE may have clarity as to what active UL BWP the UE may use. For example, the UE may transmit, during the DAPS handover, on a NUL in an active UL BWP for the SUL carrier. Transmission in a particular active UL BWP may provide for little or no interruption in service.

In some aspects, the UE may be configured or instructed to not switch uplink transmission to a source cell or source MCG between a NUL carrier and a SUL carrier. This configuration or instruction may pertain to a DAPS handover. In this way, latency caused by radio circuitry switching carriers for uplink transmission may be reduced.

In some aspects, the UE may be configured or instructed to not switch uplink transmissions to a target cell or target MCG between a NUL carrier and a SUL carrier. This configuration or instruction may pertain to a DAPS handover. In this way, latency caused by radio circuitry switching carriers for uplink transmission may be reduced.

Particular implementations of the subject matter described in this disclosure can be implemented to realize one or more potential advantages. For example, the UE may not waste processing and signaling resources due to an interruption, latency, or a loss caused by activating a wrong BWP for uplink transmission. In another example, the UE may not suffer latency or higher implementation complexity by having radio circuitry switch uplink transmission between a NUL carrier and a SUL carrier. In another example, by releasing either the SUL carrier or the NUL carrier when the DAPS handover is triggered, the UE may not suffer from high implementation complexity in switching uplink transmission between the NUL carrier and the SUL carrier while simultaneously supporting the DAPS handover.

FIG. 1 is a block diagram conceptually illustrating an example of a wireless network 100. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, or a transmit receive point (TRP). Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (such as several kilometers in radius) and may allow unrestricted access by UEs with service subscription. A pico cell may cover a relatively small geographic area and may allow unrestricted access by UEs with service subscription. A femto cell may cover a relatively small geographic area (such as a home) and may allow restricted access by UEs having association with the femto cell, such as UEs in a closed subscriber group (CSG). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple cells (such as three cells). The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces (such as a direct physical connection), a virtual network, or a combination thereof using any suitable transport network.

The wireless network 100 also may include relay stations. A relay station is an entity that can receive a transmission of data from an upstream station, such as a BS or a UE, and send a transmission of the data to a downstream station, such as a UE or a BS. A relay station also may be a UE that can relay transmissions for other UEs. In the example shown in FIG. 1, a relay station 110d may communicate with macro BS 110a and a UE 120d in order to facilitate communication between the BS 110a and the UE 120d. A relay station also may be referred to as a relay BS, a relay base station, a relay, etc.

The wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in the wireless network 100. For example, macro BSs may have a high transmit power level, such as 5 to 40 watts, while pico BSs, femto BSs, and relay BSs may have lower transmit power levels, such as 0.1 to 2 watts.

A network controller 130 may couple to a set of BSs and may provide coordination and control for these BSs. The network controller 130 may communicate with the BSs via a backhaul. The BSs also may communicate with one another, for example, directly or indirectly via a wireless or wireline backhaul.

The UEs 120, such as 120a, 120b, 120c, may be dispersed throughout wireless network 100, and each UE may be stationary or mobile. A UE also may be referred to as an access terminal, a terminal, a mobile station, a subscriber unit, a station, etc. A UE may be a cellular phone (such as a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (such as a smart ring or a smart bracelet)), an entertainment device (such as a music or video device), or a satellite radio, a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (such as a remote device), or some other entity. A wireless node may provide, for example, connectivity for or to a network, such as a wide area network (such as Internet or a cellular network), via a wired or wireless communication link. Some UEs may be considered Internet-of-Things (IoT) devices or may be implemented as NB-IoT (narrowband internet of things) devices. Some UEs may be considered a Customer Premises Equipment (CPE). The UE 120 may be included inside a housing that houses components of the UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity, such as a base station, allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities, such as one or more other UEs. In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time— frequency resources and having a cellular configuration, a P2P configuration, and a mesh configuration, a scheduling entity and one or more subordinate entities may communicate utilizing the scheduled resources.

In some aspects, two or more UEs 120 (such as UE 120a and UE 120e) may communicate directly using one or more sidelink channels, such as without using a base station 110 as an intermediary to communicate with one another. For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
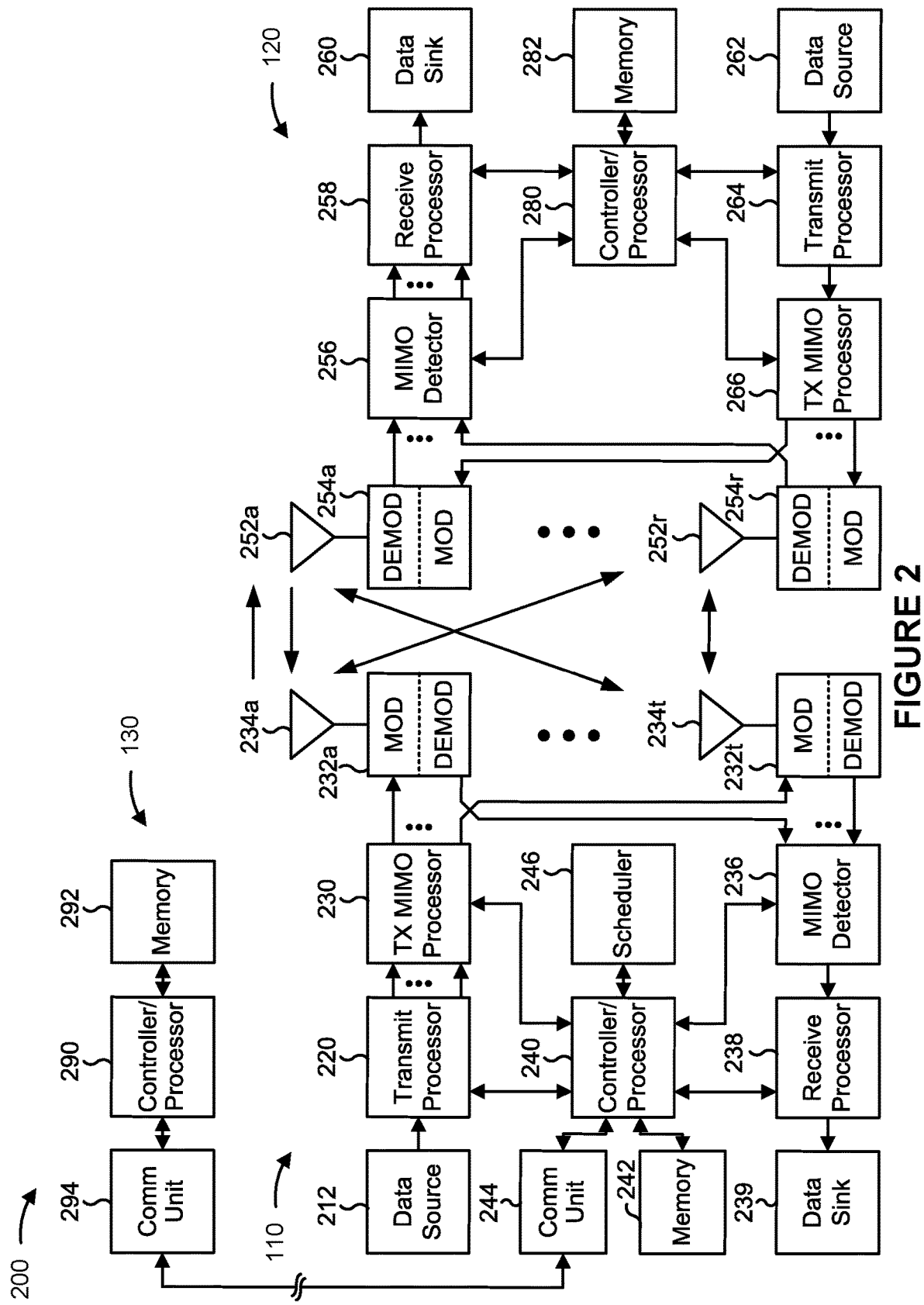
FIG. 2 is a block diagram conceptually illustrating an example of a base station in communication with a user equipment (UE) in a wireless network.

FIG. 2 is a block diagram conceptually illustrating an example 200 of a base station 110 in communication with a UE 120. In some aspects, the base station 110 and the UE 120 may respectively be one of the base stations and one of the UEs in the wireless network 100 of FIG. 1. The base station 110 may be equipped with T antennas 234a through 234t, and the UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based on channel quality indicators (CQIs) received from the UE, process (such as encode and modulate) the data for each UE based on part on the MCS(s) selected for the UE, and provide data symbols for all UEs. The transmit processor 220 also may process system information, such as for semi-static resource partitioning information (SRPI), and control information, such as CQI requests, grants, upper layer signaling, and provide overhead symbols and control symbols. The transmit processor 220 also may generate reference symbols for reference signals, such as the cell-specific reference signal (CRS), and synchronization signals, such as the primary synchronization signal (PSS) and secondary synchronization signal (SSS). A transmit (TX) multiple-input multiple-output (MIMO) processor 230 may perform spatial processing (such as precoding) on the data symbols, the control symbols, the overhead symbols, or the reference symbols, if applicable, and may provide T output symbol streams to T modulators (MODs) 232a through 232t. Each modulator 232 may process a respective output symbol stream, such as for OFDM, to obtain an output sample stream. Each modulator 232 may further process, such as convert to analog, amplify, filter, and upconvert, the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 or other base stations and may provide received signals to demodulators (DEMODs) 254a through 254r, respectively. Each demodulator 254 may condition, such as filter, amplify, downconvert, and digitize, a received signal to obtain input samples. Each demodulator 254 may further process the input samples, such as for OFDM, to obtain received symbols. A MIMO detector 256 may obtain received symbols from all R demodulators 254a through 254r, perform MIMO detection on the received symbols if applicable, and provide detected symbols. A receive processor 258 may process (such as demodulate and decode) the detected symbols, provide decoded data for the UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of the UE 120 may be included in a housing.

On the uplink, at the UE 120, a transmit processor 264 may receive and process data from a data source 262 and control information, such as for reports including RSRP, RSSI, RSRQ, or CQI, from controller/processor 280. The transmit processor 264 also may generate reference symbols for one or more reference signals. The symbols from the transmit processor 264 may be precoded by a TX MIMO processor 266 if applicable, further processed by the modulators 254a through 254r, such as for DFT-s-OFDM, or CP-OFDM, and transmitted to the base station 110. At the base station 110, the uplink signals from the UE 120 and other UEs may be received by the antennas 234, processed by the demodulators 232, detected by a MIMO detector 236 if applicable, and further processed by a receive processor 238 to obtain decoded data and control information sent by the UE 120. The receive processor 238 may provide the decoded data to a data sink 239 and the decoded control information to a controller or processor (controller/processor) 240. The base station 110 may include a communication unit 244 and communicate to the network controller 130 via a communication unit 244. The network controller 130 may include a communication unit 294, a controller or processor (controller/processor) 290, and a memory 292.

In some implementations, the controller/processor 280 may be a component of a processing system. A processing system may generally refer to a system or series of machines or components that receives inputs and processes the inputs to produce a set of outputs (which may be passed to other systems or components of, for example, the UE 120). For example, a processing system of the UE 120 may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface configured to receive or obtain information, and a second interface configured to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, the controller/processor 240 may be a component of a processing system. A processing system may generally refer to a system or series of machines or components that receives inputs and processes the inputs to produce a set of outputs (which may be passed to other systems or components of, for example, the base station 110). For example, a processing system of the base station 110 may refer to a system including the various other components or subcomponents of the base station 110.

The processing system of the base station 110 may interface with other components of the base station 110, and may process information received from other components (such as inputs or signals), output information to other components, etc. For example, a chip or modem of the base station 110 may include a processing system, a first interface configured to receive or obtain information, and a second interface configured to output, transmit or provide information. In some cases, the first interface may refer to an interface between the processing system of the chip or modem and a receiver, such that the base station 110 may receive information or signal inputs, and the information may be passed to the processing system. In some cases, the second interface may refer to an interface between the processing system of the chip or modem and a transmitter, such that the base station 110 may transmit information output from the chip or modem. A person having ordinary skill in the art will readily recognize that the second interface also may obtain or receive information or signal inputs, and the first interface also may output, transmit or provide information.

The controller/processor 240 of the base station 110, the controller/processor 280 of the UE 120, or any other component(s) of FIG. 2 may perform one or more techniques associated with mobility enhancements for unlicensed operation, as described in more detail elsewhere herein. For example, the controller/processor 240 of the base station 110, the controller/processor 280 of the UE 120, or any other component(s) (or combinations of components) of FIG. 2 may perform or direct operations of, for example, process 1000 of FIG. 10, process 1100 of FIG. 11, process 1200 of FIG. 12, process 1300 of FIG. 13, or other processes as described herein. The memories 242 and 282 may store data and program codes for the base station 110 and the UE 120, respectively. A scheduler 246 may schedule UEs for data transmission on the downlink, the uplink, or a combination thereof.

Figure 10:
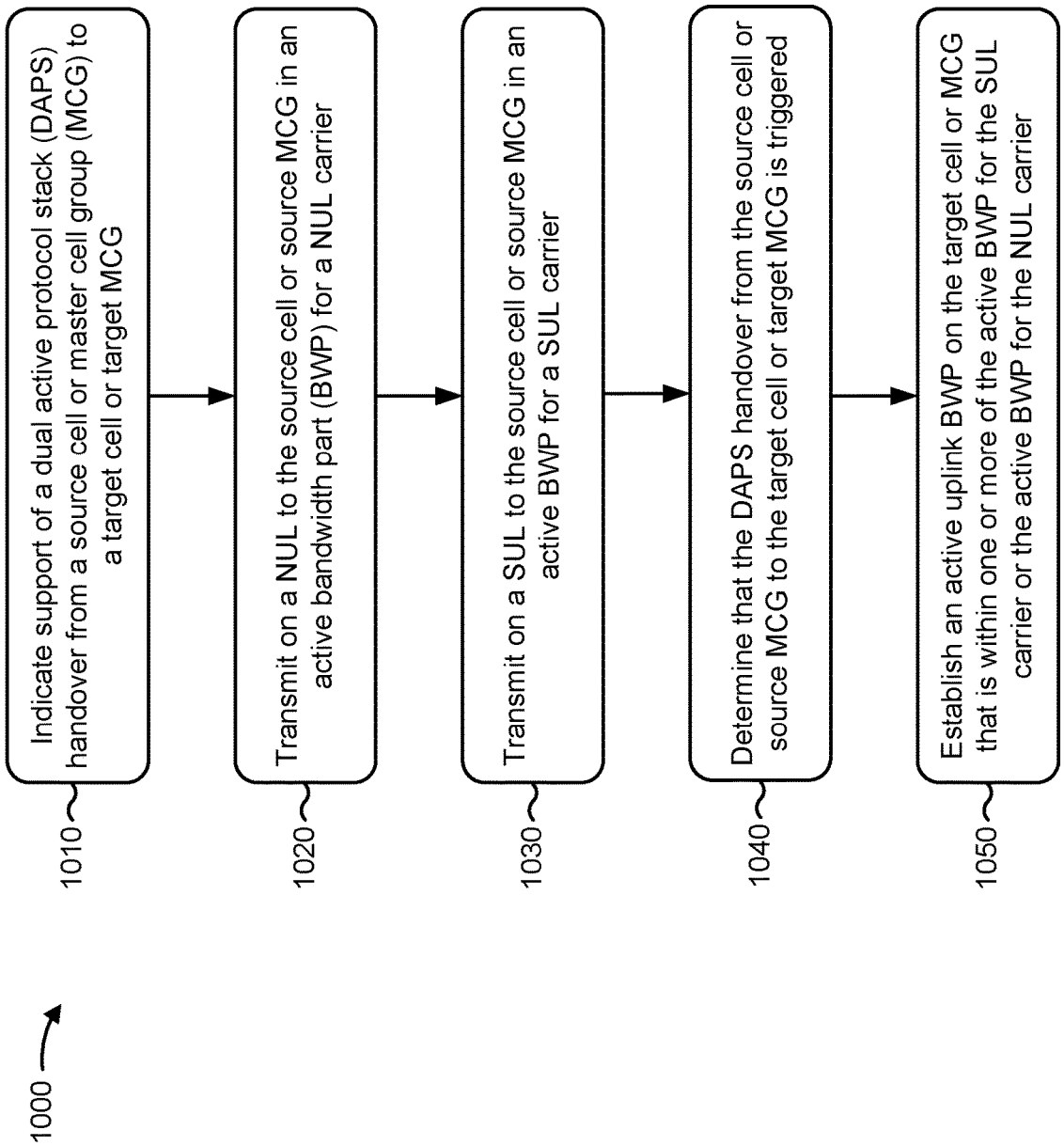
FIG. 10 is a diagram illustrating an example process performed, for example, by a UE.

The stored program codes, when executed by the controller/processor 280 or other processors and modules at the UE 120, may cause the UE 120 to perform operations described with respect to process 1000 of FIG. 10 or other processes as described herein.

In some aspects, the UE 120 may include means for indicating support of a DAPS handover from a source cell or source MCG to a target cell or target MCG, means for transmitting on a NUL to the source cell or source MCG in an active BWP for a NUL carrier, means for transmitting on a SUL to the source cell or source MCG in an active BWP for a SUL carrier, means for determining that the DAPS handover from the source cell or source MCG to the target cell or target MCG is triggered, and means for establishing, in association with the DAPS handover being triggered, an active uplink BWP on the target cell or target MCG that is within one or more of the active BWP for the SUL carrier or the active BWP for the NUL carrier, or combinations thereof. In some aspects, such means may include one or more components of the UE 120 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Figure 11:
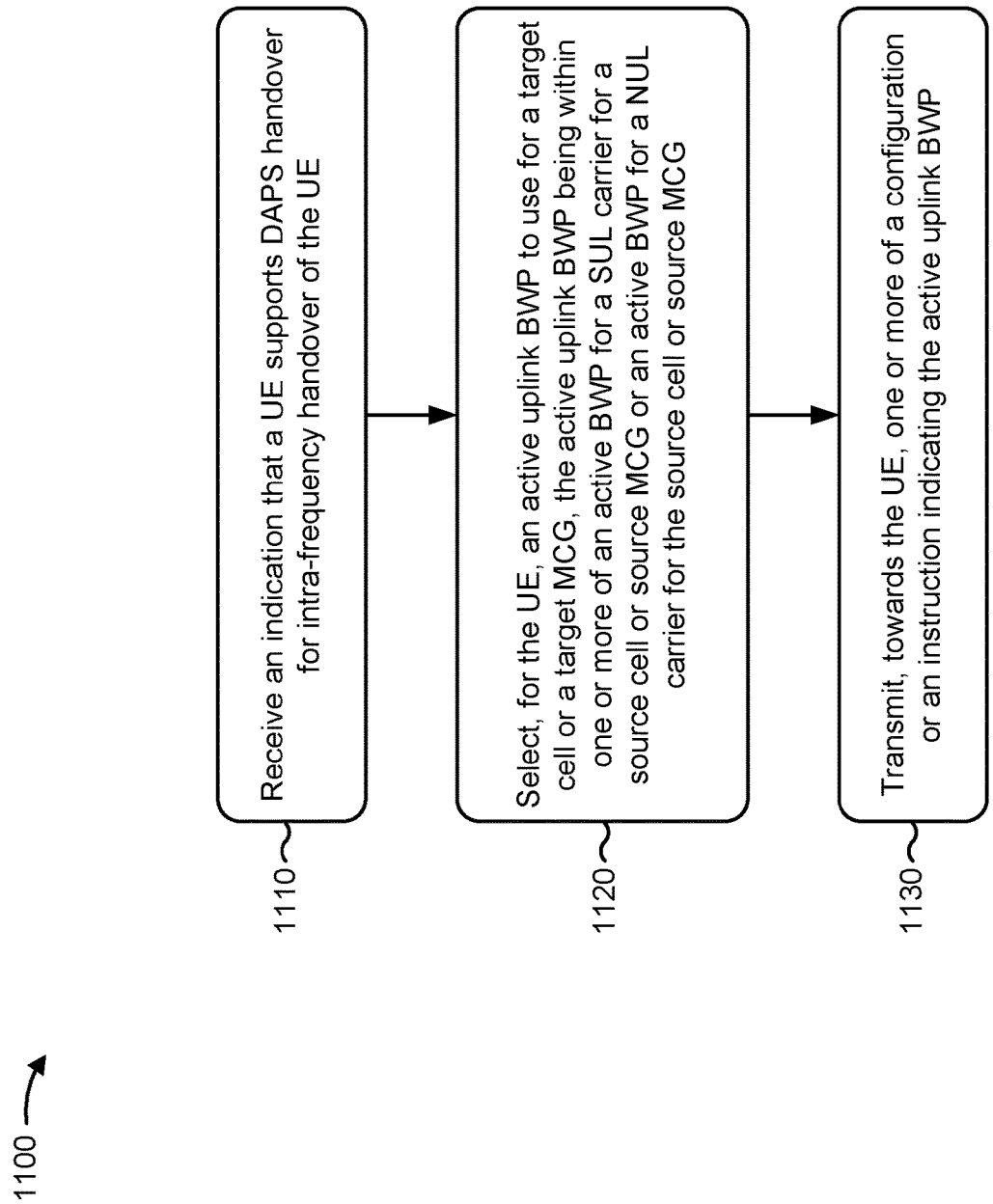
FIG. 11 is a diagram illustrating an example process performed, for example, by a base station.

The stored program codes, when executed by the controller/processor 240 or other processors and modules at the BS 110, may cause the BS 110 to perform operations described with respect to process 1100 of FIG. 11 or other processes as described herein.

In some aspects, the BS 110 may include means for determining or receiving an indication that a UE supports DAPS handover for intra-frequency handover of the UE, means for determining or selecting, for the UE, an active UL BWP to use for a target cell or a target MCG, the active uplink BWP being within one or more of an active BWP for a SUL carrier for a source cell or source MCG or an active BWP for a NUL carrier for the source cell or source MCG, and means for transmitting one or more of a configuration or an instruction indicating the active uplink BWP, or combinations thereof. In some aspects, such means may include one or more components of the BS 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 220, the receive processor 238, the TX MIMO processor 230, or another processor may be performed by or under the control of the controller/processor 240.

Figure 12:
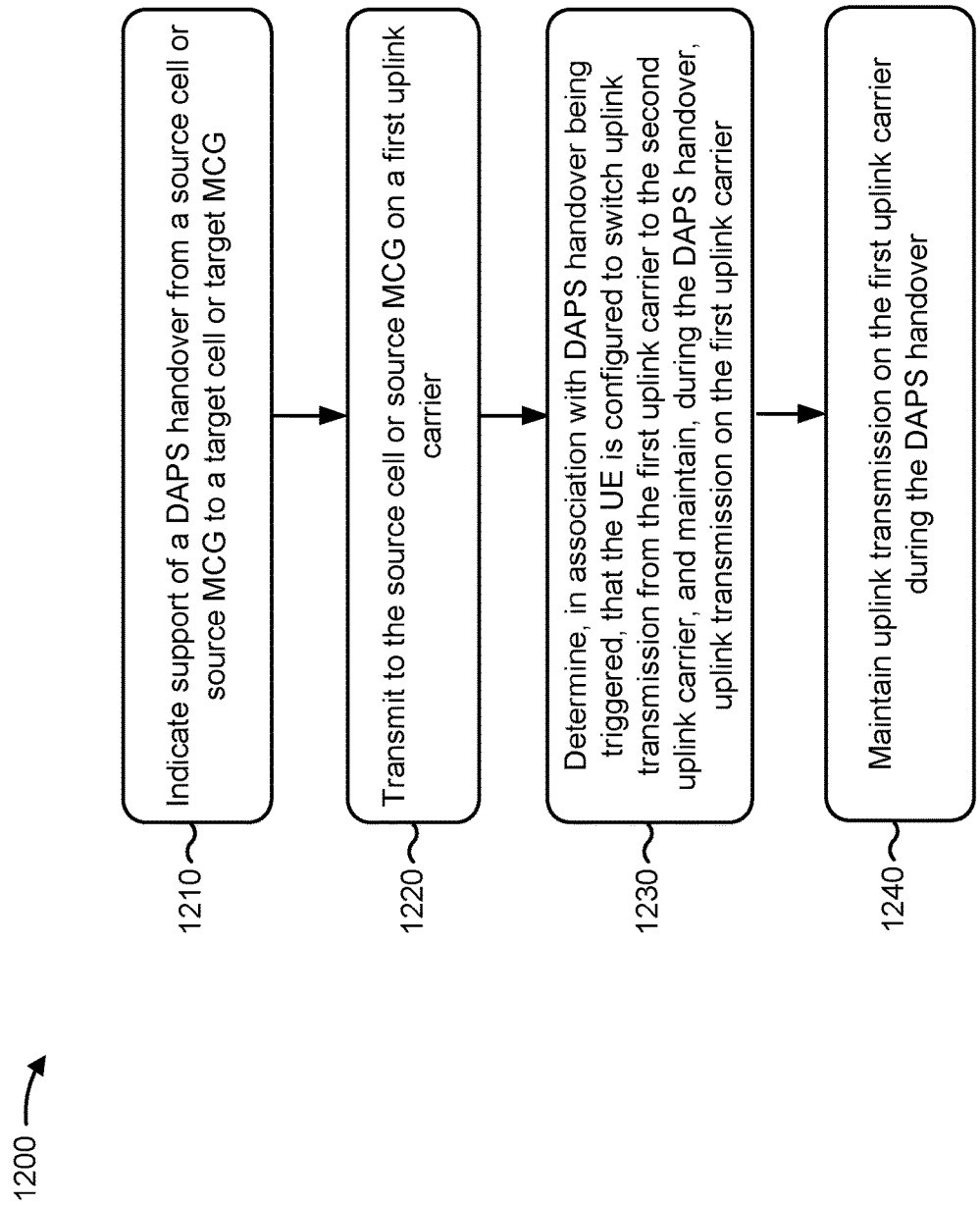
FIG. 12 is a diagram illustrating an example process performed, for example, by a UE.

The stored program codes, when executed by the controller/processor 280 or other processors and modules at the UE 120, may cause the UE 120 to perform operations described with respect to process 1200 of FIG. 12 or other processes as described herein.

In some aspects, the UE 120 may include means for indicating support of a DAPS handover from a source cell or source MCG to a target cell or target MCG, means for transmitting on a NUL to the source cell or source MCG in an active BWP for a NUL carrier, means for transmitting to the source cell or source MCG on a first uplink carrier, means for determining that the DAPS handover from the source cell or source MCG to the target cell or target MCG is triggered, and means for determining that the UE is configured to switch uplink transmission from the first uplink carrier to the second uplink carrier, that the UE is not scheduled to switch, during the DAPS handover, uplink transmission from the first uplink carrier to the second uplink carrier, or that the UE is to maintain, during the DAPS handover, uplink transmission on the first uplink carrier, or combinations thereof. The UE 120 may include means for maintaining, during the DAPS handover, uplink transmission on the first uplink carrier. In some aspects, such means may include one or more components of the UE 120 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Figure 13:
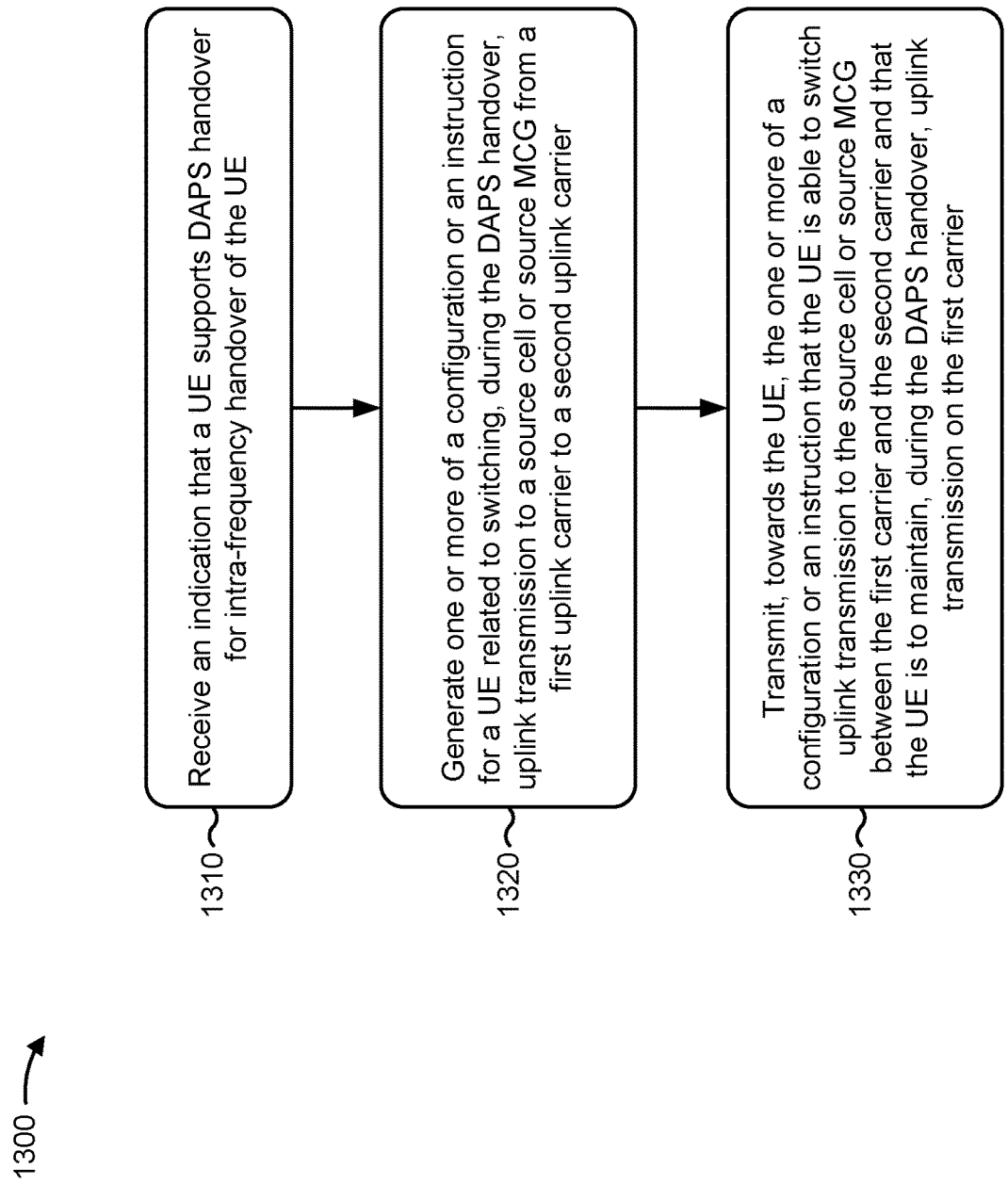
FIG. 13 is a diagram illustrating an example process performed, for example, by a base station.

The stored program codes, when executed by the controller/processor 240 or other processors and modules at the BS 110, may cause the BS 110 to perform operations described with respect to process 1300 of FIG. 13 or other processes as described herein.

In some aspects, the BS 110 may include means for determining or receiving an indication that a UE supports DAPS handover for intra-frequency handover of the UE, means for determining or generating one or more of a configuration or an instruction for a UE related to switching, during the DAPS handover, uplink transmission to a source cell or source master cell group (MCG) from a first uplink carrier to a second uplink carrier, and means for transmitting the one or more of a configuration or an instruction that the UE is able to switch uplink transmission to the source cell or source MCG between the first carrier and the second carrier and that the UE is to maintain, during the DAPS handover, uplink transmission on the first carrier, or combinations thereof. In some aspects, such means may include one or more components of the BS 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 220, the receive processor 238, the TX MIMO processor 230, or another processor may be performed by or under the control of the controller/processor 240.

A 5G access node may include an access node controller (ANC). The ANC may be a central unit (CU). A backhaul interface to a next generation core network (NG-CN) may terminate at the ANC. The backhaul interface to neighboring next generation access nodes (NG-ANs) may terminate at the ANC. The ANC may control one or more transmission and reception points, such as one or more gNBs. A gNB may be a distributed unit (DU) that is referred to as a gNB-DU.

Figure 3:
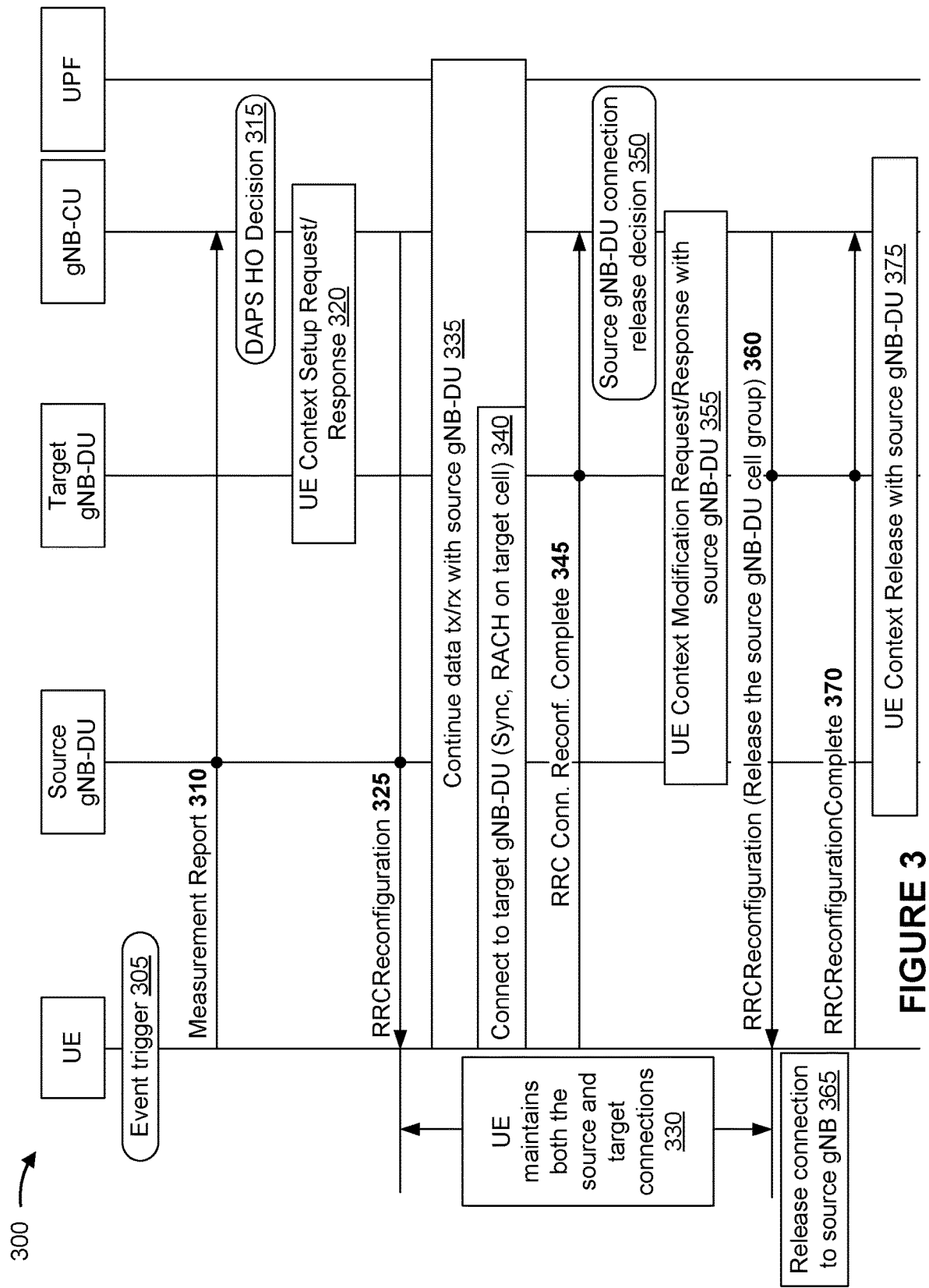
FIG. 3 is a diagram illustrating an example of a dual active protocol stack (DAPS) handover.

FIG. 3 is a diagram illustrating an example 300 of a DAPS handover. A source gNB-DU (such as BSs 110a-110d depicted and described in FIG. 1, or BS 110 depicted and described in FIG. 2) may provide a source cell for a UE (such as UEs 120a-120e depicted and described in FIG. 1, or UE 120 depicted and described in FIG. 2). The UE may be handed over from the source cell to a target cell provided by a target gNB-DU (such as BSs 110a-110d and BS 110).

As shown by reference number 305, the UE may detect an event trigger. For example, the event trigger may relate to a measurement threshold for triggering a handover from a source cell or source MCG to a target cell or target MCG. When the measurement threshold is satisfied, the UE may determine that the event trigger is detected.

As shown by reference number 310, the UE may transmit a measurement report based on detecting the event trigger. For example, the UE may transmit a measurement report to the gNB-CU via the source gNB-DU. The measurement report may identify neighbor cell measurements for one or more cells or cell groups.

As shown by reference number 315, the gNB-CU may determine that a DAPS based handover is to be performed based on the measurement report. For example, the gNB-CU may select the target gNB-DU based on a measurement identified by the measurement report.

As shown by reference number 320, the gNB-CU may transmit a UE context setup request to the target gNB-DU, and the target gNB-DU may provide a UE context setup response. The UE context setup request may indicate that the UE is to be handed over to the target gNB-DU. The target gNB-DU may set up a UE context for the UE based on the UE context setup request and may provide a UE context setup response indicating that the UE context has been set up.

As shown by reference number 325, the gNB-CU may provide a radio resource control (RRC) reconfiguration message to the UE. The RRC reconfiguration message shown by reference number 325 may reconfigure a cell group configuration of the UE and may indicate that the UE is to perform a DAPS handover from a source MCG (such as associated with the source gNB-DU) to the target MCG (such as associated with the target gNB-DU). In some aspects, the RRC reconfiguration message shown by reference number 325 may be referred to as a handover command.

As shown by reference number 330, the UE may maintain a connection to the source gNB and the target gNB during the DAPS based handover. For example, the UE may maintain respective RRC connections with the source gNB-DU and the target gNB-DU until an RRC reconfiguration message indicating to release the source MCG associated with the source gNB-DU is received. User plane interruption and handover latency may be reduced.

As shown by reference number 335, the UE may continue data transmission or reception with the source gNB-DU as the UE connects to the target gNB-DU, shown by reference number 340. For example, the UE may continue communication with the source gNB-DU as synchronization and a random access channel (RACH) procedure are performed for the target gNB-DU.

As shown by reference number 345, the UE may transmit an indication to the gNB-CU, via the target gNB-DU, that the RRC connection reconfiguration is complete. For example, the UE may transmit the indication based on successfully establishing a connection with the target gNB-DU. As shown by reference number 350, the gNB-CU may determine, based on the RRC reconfiguration complete message shown by reference number 345, that the connection with the source gNB-DU is to be released. Accordingly, as shown by reference number 355, the gNB-CU may provide, to the source gNB-DU, a UE context modification request to switch the UE's MCG from the source gNB-DU to the target gNB-DU. The source gNB-DU may provide a UE context modification response to the gNB-CU based on performing the UE context modification in accordance with the UE context modification request.

As shown by reference number 360, the gNB-CU may provide an RRC reconfiguration message to the UE. The RRC reconfiguration message may indicate that the UE is to release the source gNB-DU cell group (such as the source MCG). Accordingly, as shown by reference number 365, the UE may release the connection to the source gNB. In some aspects, a duration of the DAPS handover may be considered to be from reference number 325 to reference number 360.

As shown by reference number 370, the UE may provide an RRC reconfiguration complete message to the gNB-CU via the target gNB-DU. The RRC reconfiguration complete message may indicate that the UE has established the connection with the target gNB-DU. Accordingly, as shown by reference number 375, the gNB-CU may release a UE context with the source gNB-DU based on receiving the RRC reconfiguration complete message from the UE. Thus, the UE, the source gNB, and the target gNB may perform a DAPS based handover.

Figure 4:
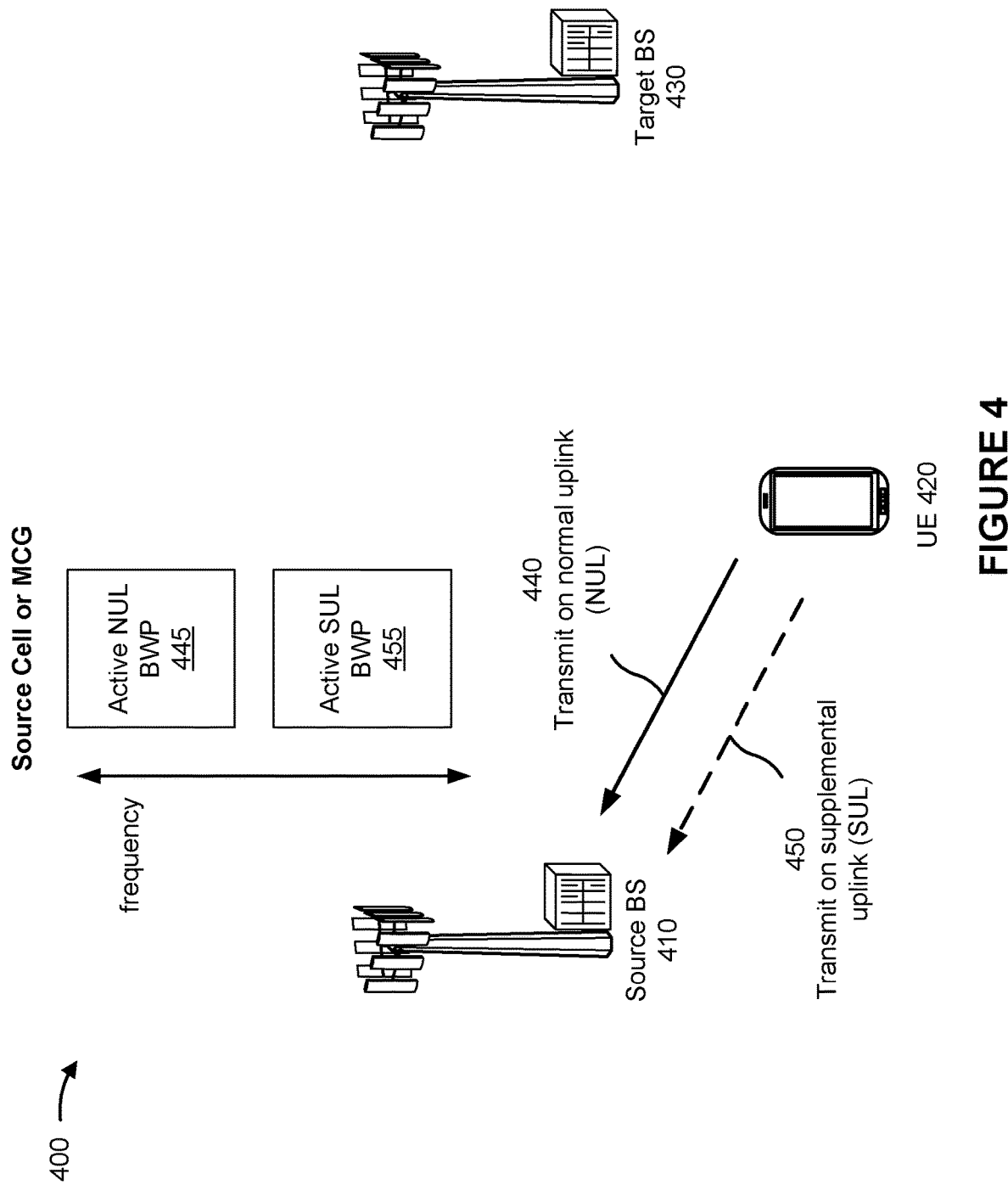
FIG. 4 is a diagram illustrating an example of bandwidth part (BWP) activation in a DAPS handover with a supplementary uplink (SUL).

FIG. 4 is a diagram illustrating an example 400 of BWP activation in a DAPS handover with a SUL. A source BS 410 (such as BSs 110a-110d depicted and described in FIG. 1, or BS 110 depicted and described in FIG. 2) may provide a source cell for a UE 420 (such as UEs 120a-120e depicted and described in FIG. 1, or UE 120 depicted and described in FIG. 2). The UE 420 may be handed over from the source cell to a target cell provided by a target BS 430 (such as BSs 110a-110d and BS 110).

The source BS 410 may provide and be referred to as a source cell or a source MCG. The source BS 410 may include a gNB-DU that is controlled by a gNB-CU. The target BS 430 may provide and be referred to as a target cell or a target MCG. The target BS 430 may include a gNB-DU that is controlled by the gNB-CU. The gNB-CU may be co-located with the source BS 410 or the target BS 430.

As shown by reference number 440, the UE 420 may establish a NUL to the source BS 410 and transmit on the NUL. The UE 420 may establish the NUL after receiving a handover command indicating that the UE 420 is to establish the NUL to the target cell. The UE 420 may use an active NUL BWP 445 for the NUL. FIG. 4 shows that the block for the active NUL BWP 445 represents a portion of a frequency band to use for uplink transmissions. The UE 420 may indicate that the UE 420 is configured to transmit on a SUL.

As shown by reference number 450, the UE 420 may establish a SUL to the source BS 410 and transmit on the SUL. The UE 420 may establish the SUL after receiving a handover command indicating that the UE 420 is to establish the SUL to the target cell. The UE 420 may use an active SUL BWP 455 for the SUL. FIG. 4 shows that the block for the active SUL BWP 455 represents another portion of the frequency band to use for uplink transmissions. The active NUL BWP 445 and the active SUL BWP 455 are provided as examples and these BWP frequency ranges may vary in size or location. Additionally, traffic on the NUL and the SUL may be aggregated.

Figure 5:
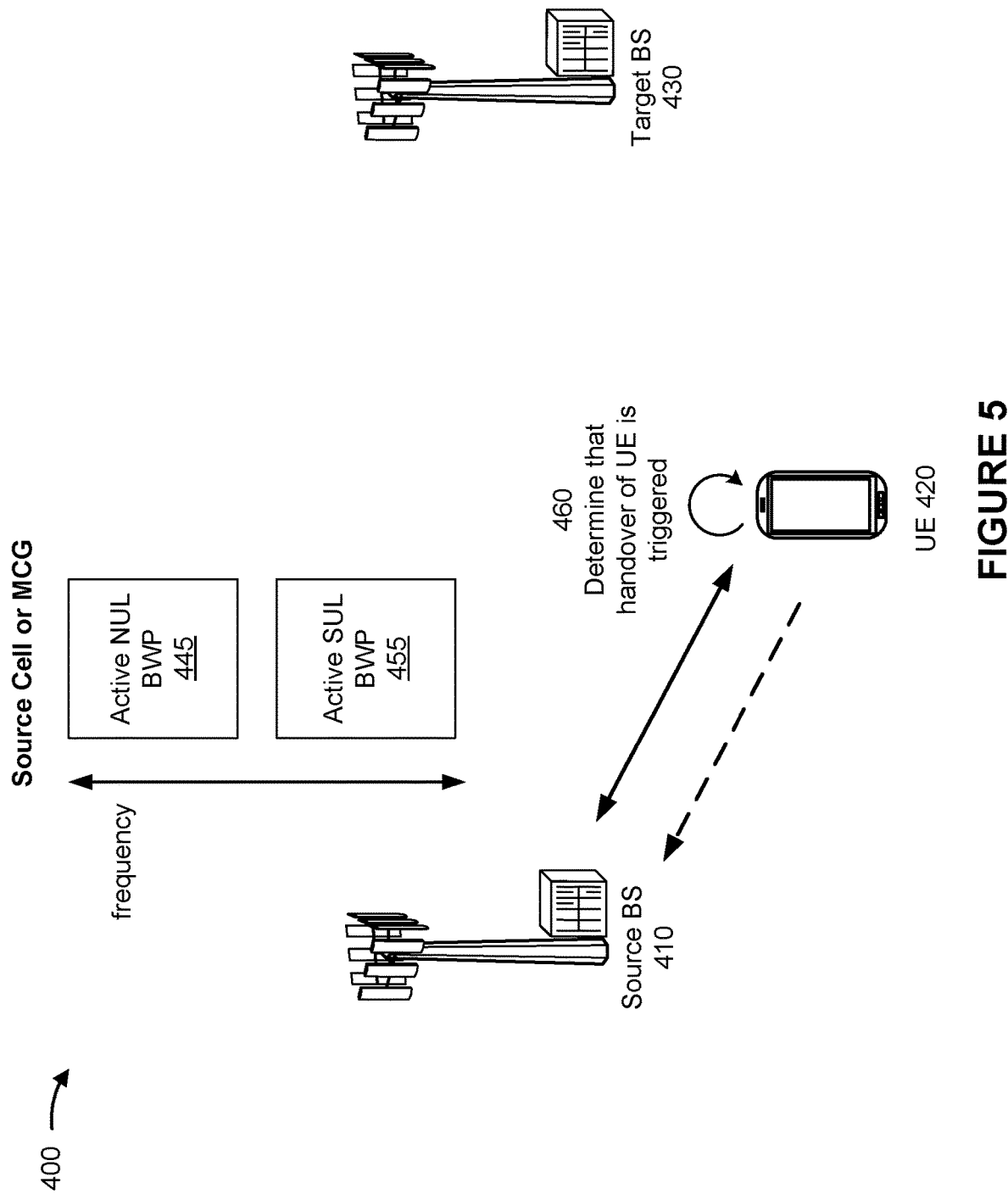
FIG. 5 is a diagram illustrating the example of BWP activation in the DAPS handover with the SUL.

FIG. 5 is a diagram illustrating the example 400 of BWP activation in a DAPS handover with a SUL. As shown by reference number 460, the UE 420 may determine that a handover is triggered. For example, the UE 420 may receive a handover command or reconfiguration message from the source BS 410. The source BS 410 may provide the message to the UE 420 after receiving a corresponding message from the target BS 430. In some aspects, the message from the source BS 410 may be related to causing a DAPS handover. The UE 420 may indicate to the source BS 410 or the target BS 430 that the UE 420 supports DAPS handover. Additionally, or alternatively, a handover may be triggered by a determination to perform measurements on signals for the source cell or on one or more target cells. In other words, UE 420 may determine that a handover is being triggered based on receiving a handover command or determining to perform measurements.

Figure 6:
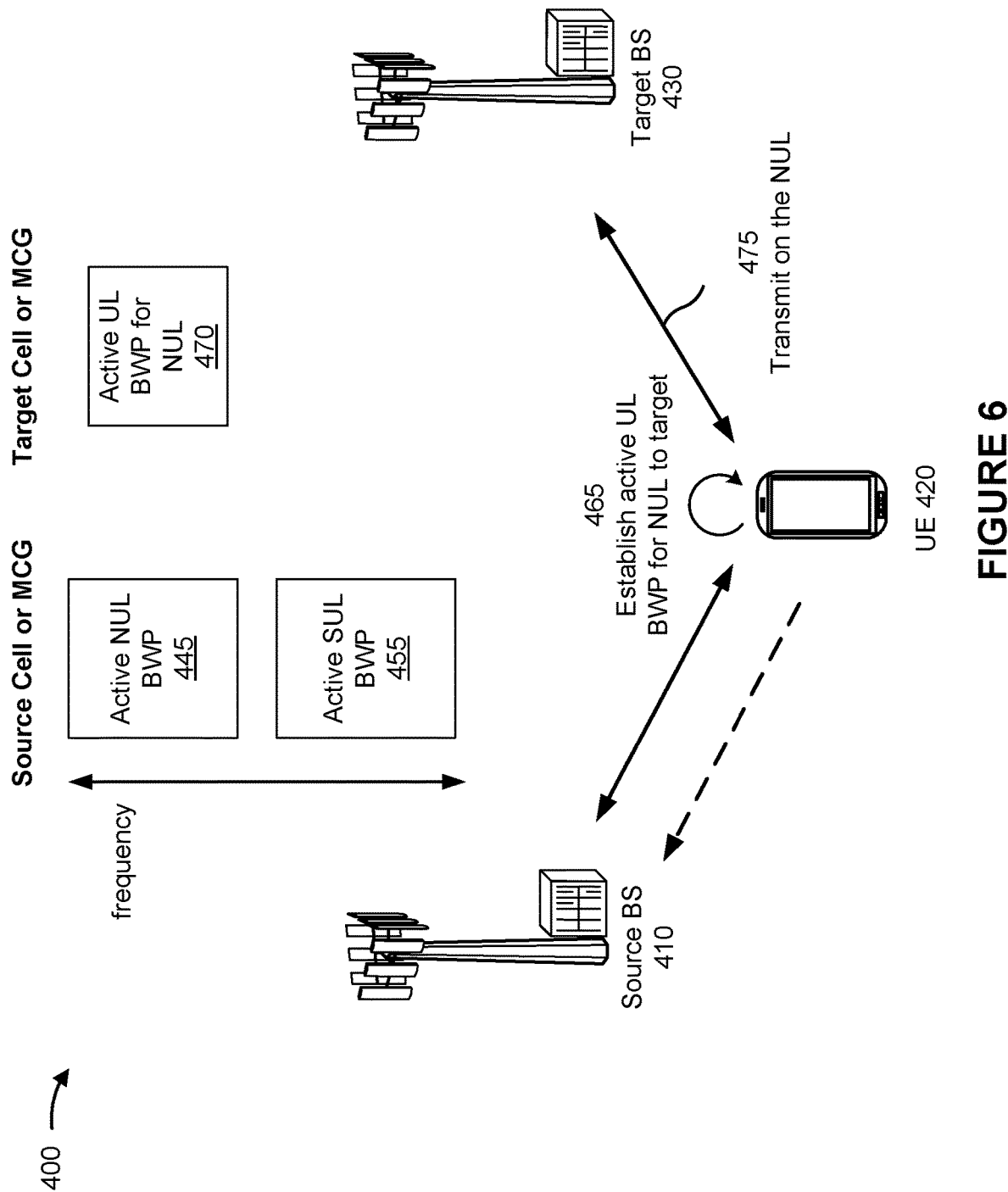
FIG. 6 is a diagram illustrating the example of BWP activation in the DAPS handover with the SUL.

FIG. 6 is a diagram illustrating the example 400 of BWP activation in a DAPS handover with a SUL. As shown by reference number 465, the UE 420 may establish an active UL BWP 470 for a NUL to the target BS 430. The active UL BWP 470 for the NUL to the target BS 430 may be located within either the active NUL BWP 445 or the active SUL BWP 455. FIG. 6 shows that the block representing the active UL BWP 470 for the NUL to the target BS 430 is aligned with the block for the active NUL BWP 445, indicating that, in the example 400 of FIG. 6, the active UL BWP 470 for the NUL to the target BS 430 is within a frequency range of the active NUL BWP 445. The UE 420 may establish the active UL BWP 470 to the target BS 430 in association with the DAPS handover being triggered, whether or not the UE 420 determines that DAPS handover is being triggered.

As shown by reference number 475, the UE 420 may transmit on the NUL. In some aspects, depending on active UL configurations at the source cell and the target cell, a transmission to the source cell over the SUL carrier or the NUL carrier may be simultaneously transmitted together with a transmission to the target cell. For example, if an active UL BWP on the target cell or target MCG is within an active UL BWP on the source cell or source MCG configured for the NUL carrier, the UE 420 may simultaneously transmit uplink transmissions to the target cell on the NUL carrier and to the source cell on the NUL carrier. In some aspects, the UE 420 may release the SUL carrier to the source cell.

Figure 7:
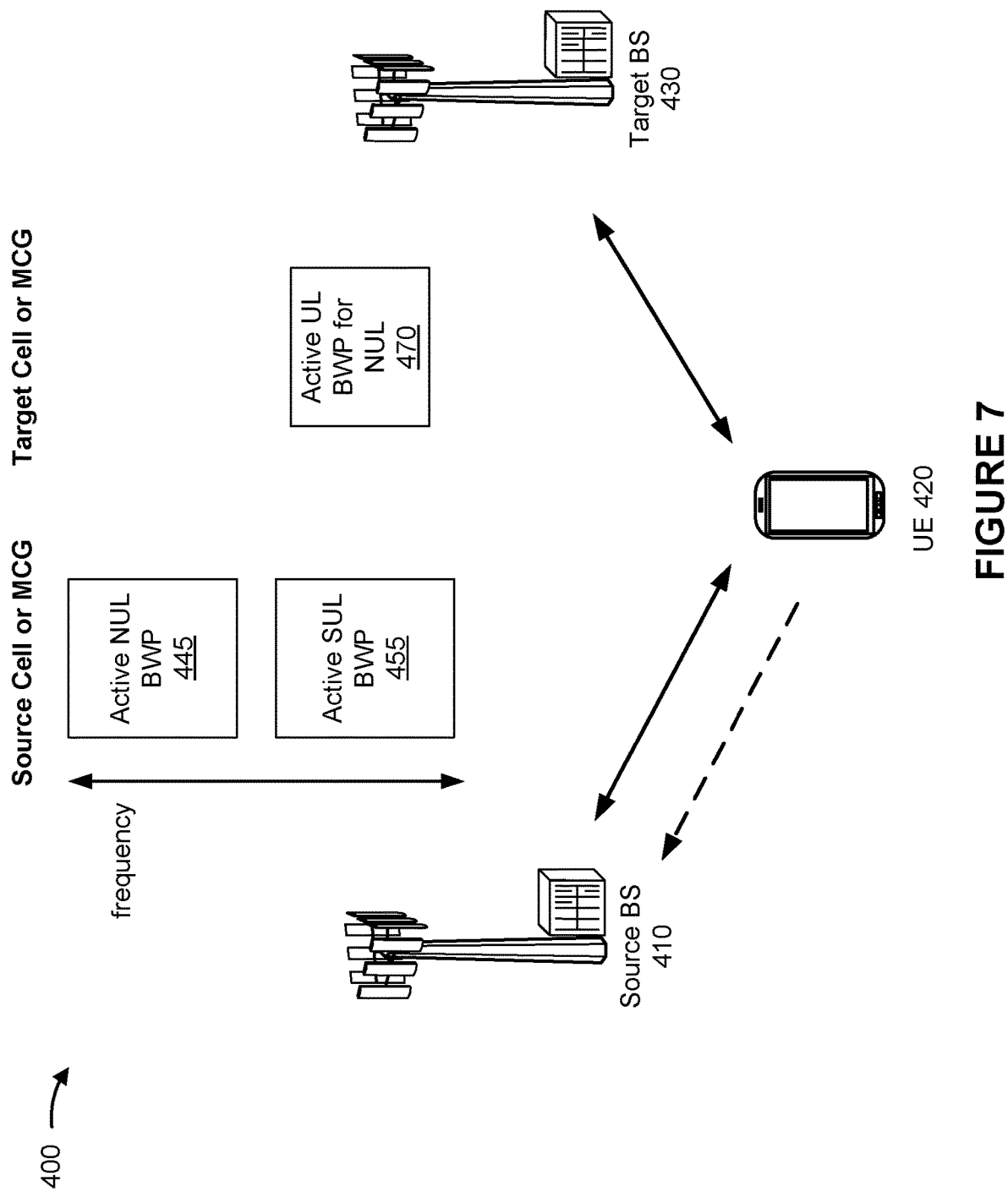
FIG. 7 is a diagram illustrating the example of BWP activation in the DAPS handover with the SUL.

FIG. 7 is a diagram illustrating the example 400 of BWP activation in a DAPS handover with a SUL. While FIG. 6 shows the active UL BWP 470 for the NUL to the target BS 430 located within the active NUL BWP 445, alternatively, FIG. 7 shows that the active UL BWP 470 for the NUL to the target BS 430 may be located within the active SUL BWP 455. This is shown by the block in FIG. 7 for the active UL BWP 470 being aligned with the block for the active SUL BWP 455. The UE 420 may establish the active UL BWP 470 to the target BS 430 in association with the DAPS handover being triggered, whether or not the UE 420 determines that DAPS handover is being triggered.

In some aspects, the UE may use an active UL BWP within the active NUL BWP 445 if the target cell or target MCG is co-channel with the NUL. The target cell or target MCG may be co-channel if they share the same channel. In some aspects, the UE may use an active UL BWP within the active SUL BWP 455 if the target cell or target MCG is co-channel with the SUL.

Figure 8:
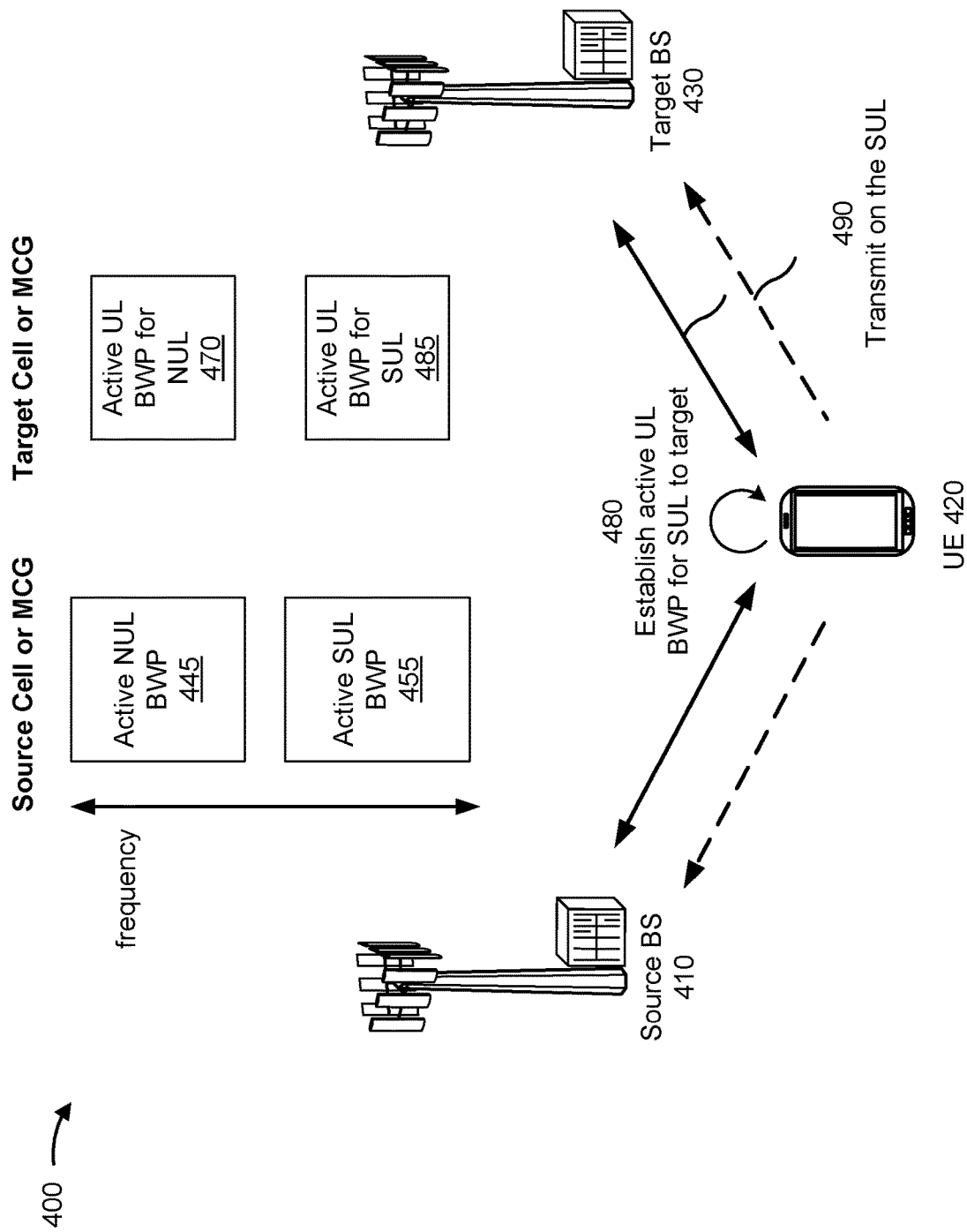
FIG. 8 is a diagram illustrating the example of BWP activation in the DAPS handover with the SUL.

FIG. 8 is a diagram illustrating the example 400 of BWP activation in a DAPS handover with a SUL. In some aspects, as shown by reference number 480, the UE 420 may establish an active UL BWP 485 for a SUL to the target BS 430. As shown by reference number 490, the UE 420 may transmit on the SUL to the target cell or target MCG. The UE 420 may use an active SUL BWP 455 for the SUL.

In some aspects, the UE 420 may be restricted to transmitting on a NUL to the target cell or target MCG using an active UL BWP within an active UL BWP for the NUL carrier. In some aspects, the UE 420 may be restricted to transmitting on a SUL to the target cell or target MCG using an active UL BWP within an active UL BWP for the SUL carrier.

Figure 9:
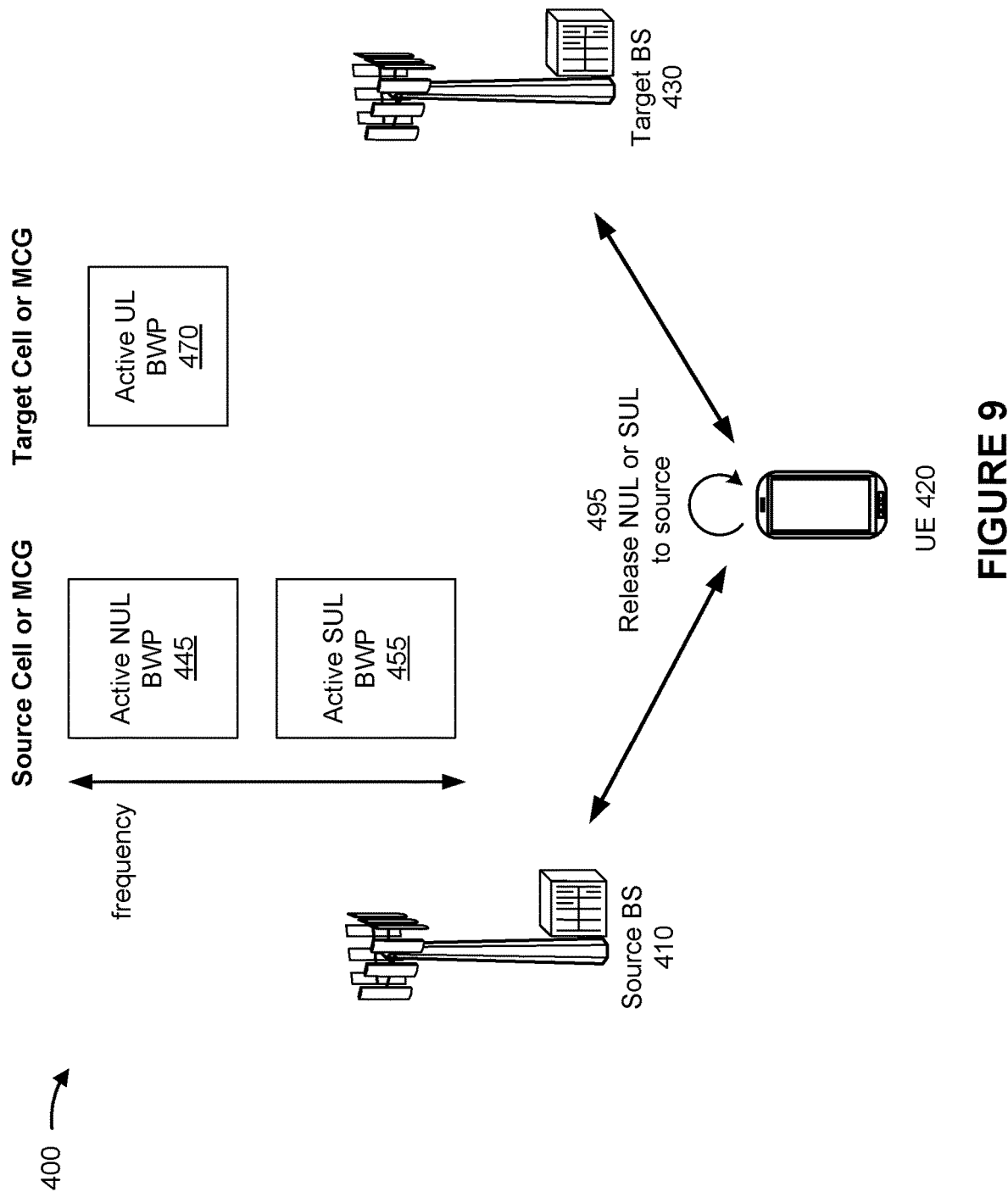
FIG. 9 is a diagram illustrating the example of BWP activation in the DAPS handover with the SUL.

FIG. 9 is a diagram illustrating the example 400 of BWP activation in a DAPS handover with a SUL. As shown by reference number 495, the UE 420 may release the NUL carrier or the SUL carrier to the source BS 410. Example 400 shows the release of the SUL carrier, leaving the NUL carrier. In some aspects, the UE 420 may switch uplink transmissions between the NUL carrier and the SUL carrier. This may be a dynamic switch that takes place during DAPS handover. The base station may indicate the switch by downlink control information (DCI) or a RACH procedure. In some aspects, while the UE 420 may be configured to switch uplink transmissions between a NUL carrier and a SUL carrier (or to switch between an active NUL BWP and an active SUL BWP), the UE 420 may not be scheduled to perform such a switch during a DAPS handover. That is, the UE 420 may maintain transmission on a carrier during DAPS handover, such as maintaining transmission on the NUL carrier or maintaining transmission on the SUL carrier. Alternatively, the UE 420 may not be configured to switch between carriers (or to switch between active UL BWPs). The source BS 410 may generate and transmit a configuration or instruction that indicates that the UE 420 is to maintain transmission on the NUL carrier or to maintain transmission on the SUL carrier.

In some aspects, the UE 420 may refrain from simultaneously transmitting, during the DAPS handover, one or more communications on the SUL to the source cell or source MCG and one or more communications on the SUL to the target cell or target MCG. This may involve releasing the SUL carrier to the source cell or source MCG before DAPS handover. The releasing of the SUL carrier may be based on the DAPS handover being triggered. The UE 420 may trigger a DAPS handover by transmitting a measurement report or by receiving the handover command. Releasing the SUL carrier before DAPS handover such that only the NUL carrier remains, for example, may reduce complexity during the DAPS handover and help the UE to conserve processing resources. In some aspects, the UE 420 may release the NUL carrier to the source cell or source MCG. The UE 420 may release the SUL carrier or the NUL carrier to the sources cell or source MCG based on receiving an indication in a handover command or a dedicated RRC message.

FIG. 10 is a diagram illustrating an example process 1000 performed, for example, by a UE. The process 1000 is an example where a UE (such as UE 120a-120e depicted and described in FIG. 1, UE 120 depicted and described in FIG. 3, or UE 420 depicted and described in FIG. 4) is activating an UL BWP in a DAPS handover with a SUL.

As shown in FIG. 10, in some aspects, process 1000 may include indicating support of a DAPS handover from a source cell or MCG to a target cell or target MCG (block 1010). For example, the UE (such as using controller/processor 280, transmit processor 264, TX MIMO processor 266, MOD 254, or antenna 252) may indicate support of a DAPS handover from a source cell or source MCG to a target cell or target MCG, as described herein.

As shown in FIG. 10, in some aspects, process 1000 may include transmitting on a NUL to the source cell or source MCG in an active BWP for a NUL carrier (block 1020). For example, the UE (such as using controller/processor 280, transmit processor 264, TX MIMO processor 266, MOD 254, or antenna 252) may transmit on a NUL to the source cell or source MCG in an active BWP for a NUL carrier, as described herein.

As shown in FIG. 10, in some aspects, process 1000 may include transmitting on a SUL to the source cell or source MCG in an active BWP for a SUL carrier (block 1030). For example, the UE (such as using controller/processor 280, transmit processor 264, TX MIMO processor 266, MOD 254, or antenna 252) may transmit on a SUL to the source cell or source MCG in an active BWP for a SUL carrier, as described herein.

As shown in FIG. 10, in some aspects, process 1000 may include determining that the DAPS handover from the source cell or source MCG to the target cell or target MCG is triggered (block 1040). For example, the UE (such as using controller/processor 280, transmit processor 264, TX MIMO processor 266, MOD 254, or antenna 252) may determine that the DAPS handover from the source cell or source MCG to the target cell or target MCG is triggered, as described herein.

As shown in FIG. 10, in some aspects, process 1000 may include establishing, in association with the DAPS handover being triggered, an active uplink BWP on the target cell or target MCG that is within one or more of the active BWP for the SUL carrier or the active BWP for the NUL carrier (block 1050). For example, the UE (such as using controller/processor 280, transmit processor 264, TX MIMO processor 266, MOD 254, or antenna 252) may establish an active uplink BWP on the target cell or target MCG that is within one or more of the active BWP for the SUL carrier or the active BWP for the NUL carrier, as described herein.

Process 1000 may include additional aspects, such as any single aspect or any combination of aspects described below or in connection with one or more other processes described elsewhere herein.

In a first aspect, establishing the active uplink BWP includes determining that the active uplink BWP on the target cell or target MCG is within the active BWP for the NUL carrier.

In a second aspect, alone or in combination with the first aspect, process 1000 includes switching, during the DAPS handover, the active uplink BWP on the source cell or source MCG from the active BWP for the NUL carrier to the active BWP for the SUL carrier.

In a third aspect, alone or in combination with the first, process 1000 includes switching, during the DAPS handover, uplink transmission to the source cell or source MCG from the NUL carrier to the SUL carrier.

In a fourth aspect, alone or in combination with the first aspect, process 1000 includes determining that the UE is not configured to switch uplink transmission from the NUL carrier to the SUL carrier.

In a fifth aspect, alone or in combination with the first aspect, process 1000 includes determining that the UE is configured to switch uplink transmission from the NUL carrier to the SUL carrier and determining that the UE is not scheduled to switch, during the DAPS handover, uplink transmission from the NUL carrier to the SUL carrier. Process 1000 may include maintaining, during the DAPS handover, uplink transmission on the NUL carrier.

In a sixth aspect, alone or in combination with one or more of the first through fifth aspects, establishing the active uplink BWP includes determining the active uplink BWP on the target cell or target MCG is within the active BWP for the SUL carrier.

In a seventh aspect, alone or in combination with the sixth aspect, process 1000 includes switching, during the DAPS handover, the active uplink BWP on the target cell or target MCG from within the active BWP for the SUL carrier to within the active BWP for the NUL carrier.

In an eighth aspect, alone or in combination with the sixth aspect, process 1000 includes switching, during the DAPS handover, uplink transmission to the source cell or source MCG from the SUL carrier to the NUL carrier.

In a ninth aspect, alone or in combination with the sixth aspect, process 1000 includes determining that the UE is not configured to switch uplink transmission from the SUL carrier to the NUL carrier.

In a tenth aspect, alone or in combination with the sixth aspect, process 1000 includes determining that the UE is configured to switch uplink transmission from the SUL carrier to the NUL carrier and determining that the UE is not scheduled to switch, during the DAPS handover, uplink transmission from the SUL carrier to the NUL carrier. Process 1000 may include maintaining, during the DAPS handover, uplink transmission on the SUL carrier.

In an eleventh aspect, alone or in combination with one or more of the first through tenth aspects, establishing the active uplink BWP includes determining that the active uplink BWP on the target cell or target MCG is within the active BWP for the NUL carrier based on a determination that the target cell is co-channel with the NUL carrier.

In a twelfth aspect, alone or in combination with one or more of the first through tenth aspects, establishing the active uplink BWP includes determining that the active uplink BWP on the target cell or target MCG is within the active BWP for the SUL carrier based on a determination that the target cell is co-channel with the SUL carrier.

In a thirteenth aspect, alone or in combination with one or more of the first through twelfth aspects, establishing the active uplink BWP is based on a configuration or instruction indicating the active uplink BWP on the target cell or target MCG is to be one of within the active BWP for the SUL carrier or within the active BWP for the NUL carrier.

In a fourteenth aspect, alone or in combination with one or more of the first through thirteenth aspects, process 1000 includes simultaneously transmitting, during the DAPS handover, one or more communications on the NUL to the source cell or source MCG and one or more communications on a NUL to the target cell or target MCG.

In a fifteenth aspect, alone or in combination with one or more of the first through fourteenth aspects, process 1000 includes establishing a SUL to the target cell or target MCG in the active uplink BWP that is within one or more of the active BWP for the SUL carrier or the active BWP for the NUL carrier.

In a sixteenth aspect, alone or in combination with one or more of the first through fifteenth aspects, process 1000 includes simultaneously transmitting, during the DAPS handover, one or more communications on the SUL to the source cell or source MCG and one or more communications on the SUL to the target cell or target MCG.

In a seventeenth aspect, alone or in combination with one or more of the first through sixteenth aspects, process 1000 includes refraining from simultaneously transmitting, during the DAPS handover, one or more communications on the SUL to the source cell or source MCG and one or more communications on the SUL to the target cell or target MCG. As the UE is not to transmit on the SUL during DAPS handover, the SUL carrier to the source cell or source MCG may be released.

In an eighteenth aspect, alone or in combination with one or more of the first through seventeenth aspects, process 1000 includes releasing, based on the DAPS handover being triggered, the SUL carrier to the source cell or source MCG.

In a nineteenth aspect, alone or in combination with the eighteenth aspect, the releasing of the SUL carrier is based on receiving a release indication in a handover command or a dedicated RRC message.

In a twentieth aspect, alone or in combination with one or more of the first through nineteenth aspects, process 1000 includes releasing, based on the DAPS handover being triggered, the NUL carrier to the source cell or source MCG.

In a twenty-first aspect, alone or in combination with the twentieth aspect, the releasing of the NUL carrier is based on receiving a release indication in a handover command or a dedicated RRC message.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a base station. The process 1100 is an example where a BS (such as BS 110*a*-110*d* depicted and described in FIG. 1, BS 110 depicted and described in FIG. 2, or a BS that controls a gNB-DU in the source BS 410 or target BS 430 in FIG. 4) receives a NUL using an active NUL BWP 445 or a SUL using an active SUL BWP 455.

As shown in FIG. 11, in some aspects, process 1100 may include receiving an indication that a UE supports DAPS handover for intra-frequency handover of the UE (block 1110). For example, the BS (such as using controller/processor 240, receive processor 238, MIMO detector 236, MOD 232, or antenna 234) may receive an indication that a UE supports DAPS handover for intra-frequency handover of the UE, as described herein.

As shown in FIG. 11, in some aspects, process 1100 may include selecting, for the UE, an active uplink BWP to use for a target cell or a target MCG (block 1120). In some aspects, the active uplink BWP may be within one or more of an active BWP for a SUL carrier for a source cell or source MCG or an active BWP for a NUL carrier for the source cell or source MCG. For example, the BS (such as using controller/processor 240, receive processor 238, MIMO detector 236, MOD 232, or antenna 234) may select, for the UE, an active uplink BWP to use for a target cell or a target MCG, as described herein.

As shown in FIG. 11, in some aspects, process 1100 may include transmitting one or more of a configuration or an instruction indicating the active uplink BWP (block 1130). For example, the BS (such as using controller/processor 240, receive processor 238, MIMO detector 236, MOD 232, or antenna 234) may transmit one or more of a configuration or an instruction indicating the active uplink BWP, as described herein.

Process 1100 may include additional aspects, such as any single aspect or any combination of aspects described below or in connection with one or more other processes described elsewhere herein.

In a first aspect, the active uplink BWP is within the active BWP for the NUL carrier.

In a second aspect, the active uplink BWP is within the active BWP for the SUL carrier.

In a third aspect, alone or in combination with one or more of the first and second aspects, the configuration is transmitted to the UE in an RRC message.

In a fourth aspect, alone or in combination with one or more of the first through third aspects, the instruction is transmitted in DCI.

In a fifth aspect, alone or in combination with one or more of the first through fourth aspects, the one or more of a configuration or an instruction indicates that the UE is able to switch uplink transmission to the source cell or source MCG between the SUL carrier and the NUL carrier.

In a sixth aspect, alone or in combination with one or more of the first through fifth aspects, the one or more of a configuration or an instruction indicates to the UE that the UE is not scheduled to switch, during the DAPS handover, uplink transmission between the SUL carrier and the NUL carrier. The configuration or instruction may indicate to the UE that the UE is to maintain, during the DAPS handover, uplink transmission on the SUL carrier or the NUL carrier.

In a seventh aspect, alone or in combination with one or more of the first through sixth aspects, the one or more of a configuration or an instruction indicates that the UE is not able to switch uplink transmission between the SUL carrier and the NUL carrier.

In an eighth aspect, alone or in combination with one or more of the first through seventh aspects, process 1100 includes transmitting, in a handover command or a dedicated RRC message, an indication to release the SUL carrier to the source cell or source MCG based on the DAPS handover being triggered.

In a ninth aspect, alone or in combination with one or more of the first through eighth aspects, the releasing of the NUL carrier is based on receiving a release indication in a handover command or a dedicated RRC message.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a UE, in accordance with various aspects of the present disclosure. Example process 1200 is an example where the UE (such as using controller/processor 280, transmit processor 264, TX MIMO processor 266, MOD 254, or antenna 252) performs operations associated with switching between a NUL carrier and a SUL carrier for uplink transmission.

As shown in FIG. 12, in some aspects, process 1200 may include indicating support of a DAPS handover from a source cell or source MCG to a target cell or target MCG (block 1210). For example, the UE (such as using controller/processor 280, transmit processor 264, TX MIMO processor 266, MOD 254, or antenna 252) may indicate support of a DAPS handover from a source cell or source MCG to a target cell or target MCG, as described herein.

As shown in FIG. 12, in some aspects, process 1200 may include transmitting to the source cell or source MCG on a first uplink carrier (block 1220). For example, the UE (such as using controller/processor 280, transmit processor 264, TX MIMO processor 266, MOD 254, or antenna 252) may transmit to the source cell or source MCG on a first uplink carrier, as described herein.

As shown in FIG. 12, in some aspects, process 1200 may include determining, in association with the DAPS handover being triggered, that the UE is configured to switch uplink transmission from the first uplink carrier to the second uplink carrier, and that the UE is to maintain, during the DAPS handover, uplink transmission on the first uplink carrier (block 1230). For example, the UE (such as using controller/processor 280, transmit processor 264, TX MIMO processor 266, MOD 254, or antenna 252) may determine, in association with the DAPS handover being triggered, that the UE is configured to switch uplink transmission from the first uplink carrier to the second uplink carrier, and that the UE is to maintain, during the DAPS handover, uplink transmission on the first uplink carrier, as described herein.

As shown in FIG. 12, in some aspects, process 1200 may include maintaining, during the DAPS handover, uplink transmission on the first carrier (block 1240). For example, the UE (such as using controller/processor 280, transmit processor 264, TX MIMO processor 266, MOD 254, or antenna 252) may maintain, during the DAPS handover, uplink transmission on the first carrier, as described herein.

Process 1200 may include additional aspects, such as any single aspect or any combination of aspects described below or in connection with one or more other processes described elsewhere herein.

In a first aspect, the first carrier is a normal uplink carrier and the second carrier is a supplementary uplink carrier.

In a second aspect, the second carrier is a normal uplink carrier and the first carrier is a supplementary uplink carrier.

In a third aspect, alone or in combination with one or more of the first and second aspects, process 1200 includes determining that the UE is not configured to switch uplink transmission from the first uplink carrier to the second uplink carrier.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram illustrating an example process 1300 performed, for example, by a base station, in accordance with various aspects of the present disclosure. Example process 1300 is an example where a BS (such as BS 110a-110d depicted and described in FIG. 1, BS 110 depicted and described in FIG. 2, or a BS that controls a gNB-DU in the source BS 410 or target BS 430 in FIG. 4) performs operations associated with switching between a NUL carrier and a SUL carrier for uplink transmission by a UE.

As shown in FIG. 13, in some aspects, process 1300 may include receiving an indication that a UE supports DAPS handover for intra-frequency handover of the UE (block 1310). For example, the BS (such as using controller/processor 240, receive processor 238, MIMO detector 236, MOD 232, or antenna 234) may receive an indication that a UE supports DAPS handover for intra-frequency handover of the UE, as described herein.

As shown in FIG. 13, in some aspects, process 1300 may include generating one or more of a configuration or an instruction for a UE related to switching, during the DAPS handover, uplink transmission to a source cell or source MCG from a first uplink carrier to a second uplink carrier (block 1320). For example the BS (such as using controller/processor 240, receive processor 238, MIMO detector 236, MOD 232, or antenna 234) may generate one or more of a configuration or an instruction for a UE related to switching, during the DAPS handover, uplink transmission to a source cell or source MCG from a first uplink carrier to a second uplink carrier, as described herein.

As shown in FIG. 13, in some aspects, process 1300 may include transmitting the one or more of a configuration or an instruction that the UE is able to switch uplink transmission to the source cell or source MCG between the first carrier and the second carrier and that the UE is to maintain, during the DAPS handover, uplink transmission on the first carrier (block 1330). For example, the BS (such as using controller/processor 240, receive processor 238, MIMO detector 236, MOD 232, or antenna 234) may transmit the one or more of a configuration or an instruction that the UE is able to switch uplink transmission to the source cell or source MCG between the first carrier and the second carrier and that the UE is to maintain, during the DAPS handover, uplink transmission on the first carrier, as described herein.

Process 1300 may include additional aspects, such as any single aspect or any combination of aspects described below or in connection with one or more other processes described elsewhere herein.

In a first aspect, the one or more of a configuration or an instruction indicates that the UE is able to switch uplink transmission to the source cell or source MCG between the first carrier and the second carrier.

In a second aspect, the one or more of a configuration or an instruction indicates to the UE that the UE is not scheduled to switch, during the DAPS handover, uplink transmission between the first carrier and the second carrier. The configuration or instruction may indicate to the UE that the UE is to maintain, during the DAPS handover, uplink transmission on the first carrier (if uplink transmission was on the first carrier before the DAPS handover) or to maintain, during the DAPS handover, uplink transmission on the second carrier (if uplink transmission was on the second carrier before the DAPS handover).

In a third aspect, alone or in combination with one or more of the first and second aspects, the one or more of a configuration or an instruction indicates that the UE is able to switch uplink transmission to the target cell or target MCG between the first carrier and the second carrier.

In a fourth aspect, alone or in combination with one or more of the first through third aspects, the one or more of a configuration or an instruction indicates to the UE that the UE is not scheduled to switch, during the DAPS handover, uplink transmission between the first carrier and the second carrier. The configuration or instruction may indicate to the UE that the UE is to maintain, during the DAPS handover, uplink transmission on the first carrier or on the second carrier.

In a fifth aspect, alone or in combination with one or more of the first through fourth aspects, the one or more of a configuration or an instruction indicates that the UE is not able to switch uplink transmission between the first carrier and the second carrier.

In a sixth aspect, alone or in combination with one or more of the first through fifth aspects, the first carrier is a normal uplink carrier and the second carrier is a supplementary uplink carrier.

In a seventh aspect, alone or in combination with one or more of the first through sixth aspects, the second carrier is a normal uplink carrier and the first carrier is a supplementary uplink carrier.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
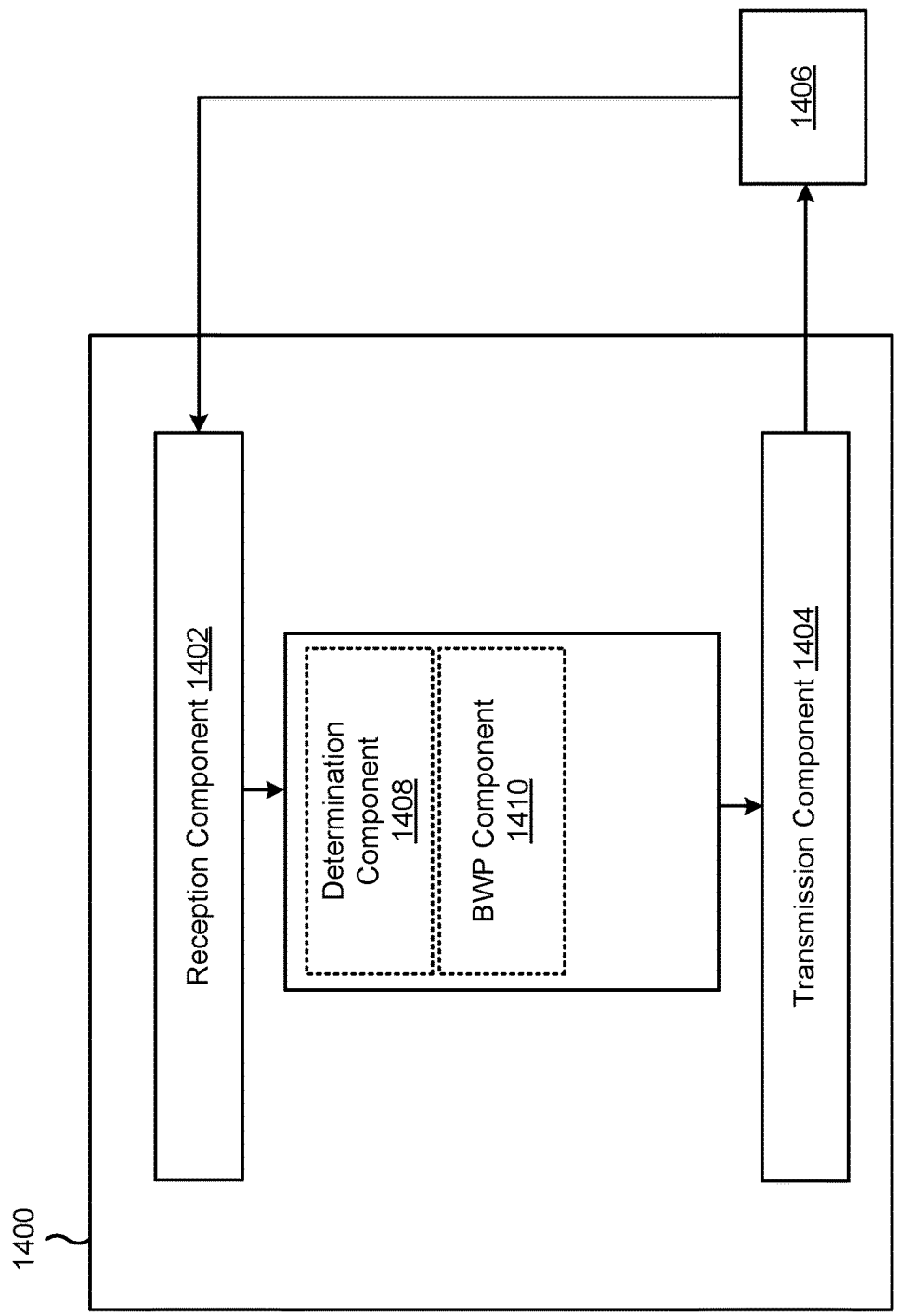
FIG. 14 is a block diagram of an example apparatus for wireless communication.

FIG. 14 is a block diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (such as via one or more buses or one or more other components). As shown, the apparatus 1400 may communicate with another apparatus 1406 (such as a UE, a base station, or another wireless communication device) using the reception component 1402 and the transmission component 1404. As shown, the apparatus 1400 may include a determination component 1408 or a BWP component 1410, among other examples. The determination component 1408 may be implemented to determine if an action is triggered, obtain information indicating where an action is triggered, receive an indication that an action is triggered, make a selection, or transmit information that triggers an action. The information may be handover information or measurement information.

In some aspects, the apparatus 1400 may be configured to perform one or more operations described herein in connection with FIGS. 1-9. Additionally, or alternatively, the apparatus 1400 may be configured to perform one or more processes described herein, such as process 1000 of FIG. 10. In some aspects, the apparatus 1400 or one or more components shown in FIG. 14 may include one or more components of the UE described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the UE described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the UE described above in connection with FIG. 2. In some aspects, the transmission component 1404 may be co-located with the reception component 1402 in a transceiver.

In some aspects, the transmission component 1404 may be a component of a processing system. For example, a processing system of the apparatus 1400 may refer to a system including the various other components or subcomponents of the apparatus 1400.

The processing system of the apparatus 1400 may interface with other components of the apparatus 1400, and may process information received from other components (such as inputs or signals), output information to other components, etc. For example, a chip or modem of the apparatus 1400 may include a processing system, the reception component 1402 to receive or obtain information, and the transmission component 1404 to output, transmit or provide information. In some cases, the reception component 1402 may refer to an interface between the processing system of the chip or modem and a receiver, such that the apparatus 1400 may receive information or signal inputs, and the information may be passed to the processing system. In some cases, the transmission component 1404 may refer to an interface between the processing system of the chip or modem and a transmitter, such that the apparatus 1400 may transmit information output from the chip or modem. A person having ordinary skill in the art will readily recognize that the second interface also may obtain or receive information or signal inputs, and the first interface also may output, transmit or provide information.

The transmission component 1404 may indicate support of a DAPS handover from a source cell or source MCG to a target cell or target MCG. The transmission component 1404 may transmit on a NUL to the source cell or source MCG in an active BWP for a NUL carrier. The transmission component 1404 may transmit on a SUL to the source cell or source MCG in an active BWP for a SUL carrier. The determination component 1408 may determine that the DAPS handover from the source cell or source MCG to the target cell or target MCG is triggered. The BWP component 1410 may establish, in association with the DAPS handover being triggered, an active uplink BWP on the target cell or target MCG that is within one or more of the active BWP for the SUL carrier or the active BWP for the NUL carrier.

The BWP component 1410 may switch, during the DAPS handover, the active uplink BWP on the source cell or source MCG from the active BWP for the NUL carrier to the active BWP for the SUL carrier. The BWP component 1410 may switch, during the DAPS handover, uplink transmission to the source cell or source MCG from the NUL carrier to the SUL carrier. The determination component 1408 may determine that the UE is not configured to switch uplink transmission from the NUL carrier to the SUL carrier.

The determination component 1408 may determine that the UE is configured to switch uplink transmission from the NUL carrier to the SUL carrier. The transmission component 1404 may maintain, during the DAPS handover, uplink transmission on the NUL carrier. The BWP component 1410 may switch, during the DAPS handover, the active uplink BWP on the target cell or target MCG from within the active BWP for the SUL carrier to within the active BWP for the NUL carrier.

The transmission component 1404 may switch, during the DAPS handover, uplink transmission to the source cell or source MCG from the SUL carrier to the NUL carrier. The determination component 1408 may determine that the UE is not configured to switch uplink transmission from the SUL carrier to the NUL carrier.

The determination component 1408 may determine that the UE is configured to switch uplink transmission from the SUL carrier to the NUL carrier. The transmission component 1404 may maintain, during the DAPS handover, uplink transmission on the SUL carrier.

The transmission component 1404 may simultaneously transmit, during the DAPS handover, one or more communications on the NUL to the source cell or source MCG and one or more communications on a NUL to the target cell or target MCG. The transmission component 1404 may release, based on the DAPS handover being triggered, the SUL carrier to the source cell or source MCG. The transmission component 1404 may establish a SUL to the target cell or target MCG in the active uplink BWP that is within one or more of the active BWP for the SUL carrier or the active BWP for the NUL carrier.

The transmission component 1404 may simultaneously transmit, during the DAPS handover, one or more communications on the SUL to the source cell or source MCG and one or more communications on the SUL to the target cell or target MCG. The transmission component 1404 may refrain from simultaneously transmitting, during the DAPS handover, one or more communications on the SUL to the source cell or source MCG and one or more communications on the SUL to the target cell or target MCG. The transmission component 1404 may release, based on the DAPS handover being triggered, the NUL carrier to the source cell or source MCG.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
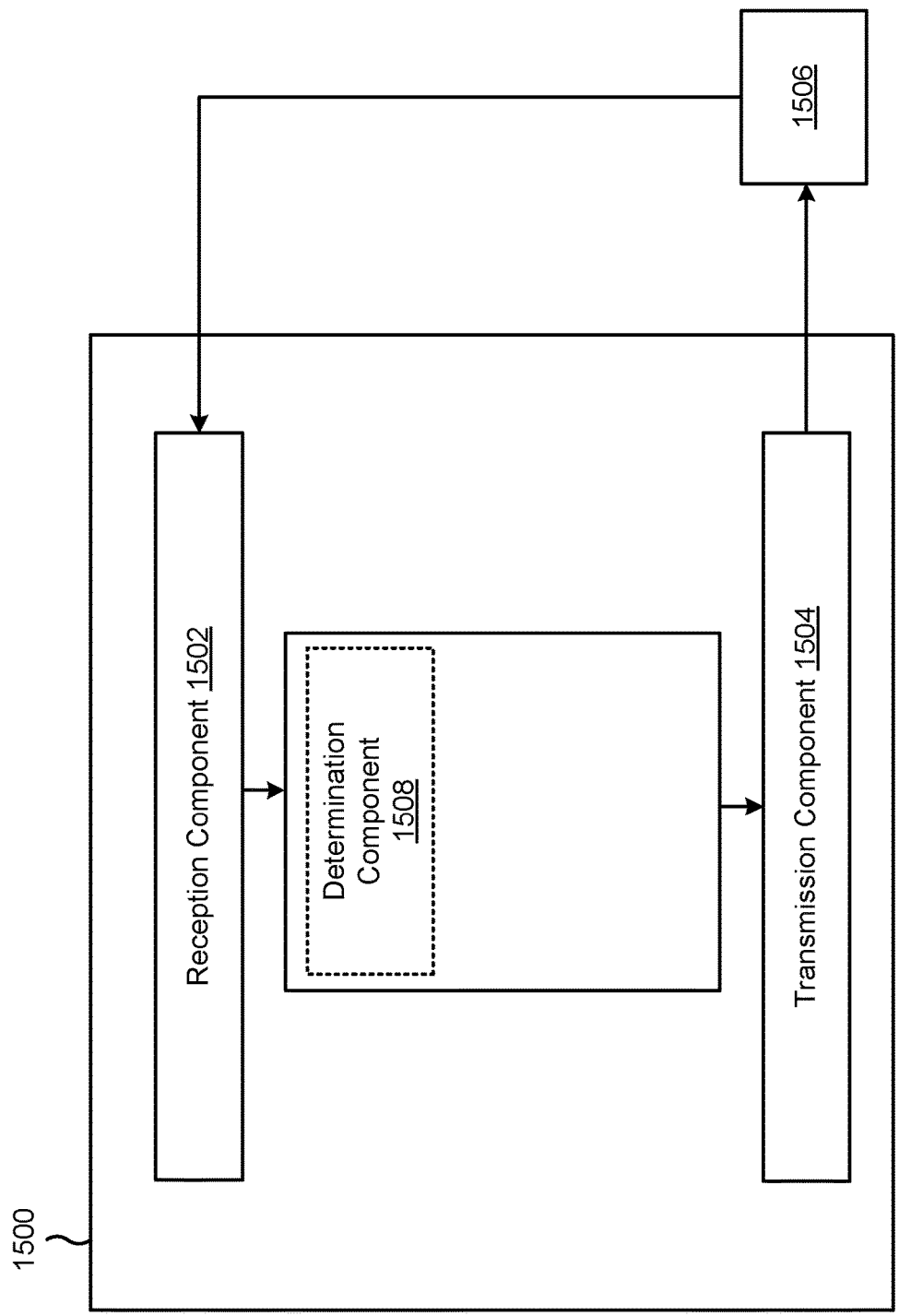
FIG. 15 is a block diagram of an example apparatus for wireless communication.

FIG. 15 is a block diagram of an example apparatus 1500 for wireless communication. The apparatus 1500 may be a base station, or a base station may include the apparatus 1500. In some aspects, the apparatus 1500 includes a reception component 1502 and a transmission component 1504, which may be in communication with one another (such as one or more buses or one or more other components). As shown, the apparatus 1500 may communicate with another apparatus 1506 (such as a UE, a base station, or another wireless communication device) using the reception component 1502 and the transmission component 1504. As shown, the apparatus 1500 may include a determination component 1508, among other examples. The determination component 1408 may be implemented to determine if a UE supports DAPS handover, obtain information indicating that the UE supports DAPS handover, receives an indication that the UE supports DAPS handover, select an uplink BWP, transmit information that indicates a selection of an uplink BWP.

In some aspects, the apparatus 1500 may be configured to perform one or more operations described herein in connection with FIGS. 1-9. Additionally, or alternatively, the apparatus 1500 may be configured to perform one or more processes described herein, such as process 1100 of FIG. 11. In some aspects, the apparatus 1500 or one or more components shown in FIG. 15 may include one or more components of the base station described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the base station described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the base station described above in connection with FIG. 2. In some aspects, the transmission component 1504 may be co-located with the reception component 1502 in a transceiver. In some aspects, the transmission component 1504 may be a component of a processing system. For example, a processing system of the apparatus 1500 may refer to a system including the various other components or subcomponents of the apparatus 1500.

The processing system of the apparatus 1500 may interface with other components of the apparatus 1500, and may process information received from other components (such as inputs or signals), output information to other components, etc. For example, a chip or modem of the apparatus 1500 may include a processing system, the reception component 1502 to receive or obtain information, and the transmission component 1504 to output, transmit or provide information. In some cases, the reception component 1502 may refer to an interface between the processing system of the chip or modem and a receiver, such that the apparatus 1500 may receive information or signal inputs, and the information may be passed to the processing system. In some cases, the transmission component 1504 may refer to an interface between the processing system of the chip or modem and a transmitter, such that the apparatus 1500 may transmit information output from the chip or modem. A person having ordinary skill in the art will readily recognize that the second interface also may obtain or receive information or signal inputs, and the first interface also may output, transmit or provide information.

The reception component 1502 may receive an indication that a UE supports DAPS handover. The determination component 1508 may determine that the UE supports DAPS handover for intra-frequency handover of the UE. The determination component 1508 may determine or select, for the UE, an active uplink BWP to use for a target cell or a target MCG, the active uplink BWP being within one or more of an active BWP for a SUL carrier for a source cell or source MCG or an active BWP for a NUL carrier for the source cell or source MCG transmitting one or more of a configuration or an instruction indicating the active uplink BWP.

The transmission component 1504 may transmit, in a handover command or a dedicated RRC message, an indication to release the SUL carrier to the source cell or source MCG based on the DAPS handover being triggered. The transmission component 1504 may transmit, in a handover command or a dedicated RRC message, an indication to release the NUL carrier to the source cell or source MCG based on the DAPS handover being triggered. The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
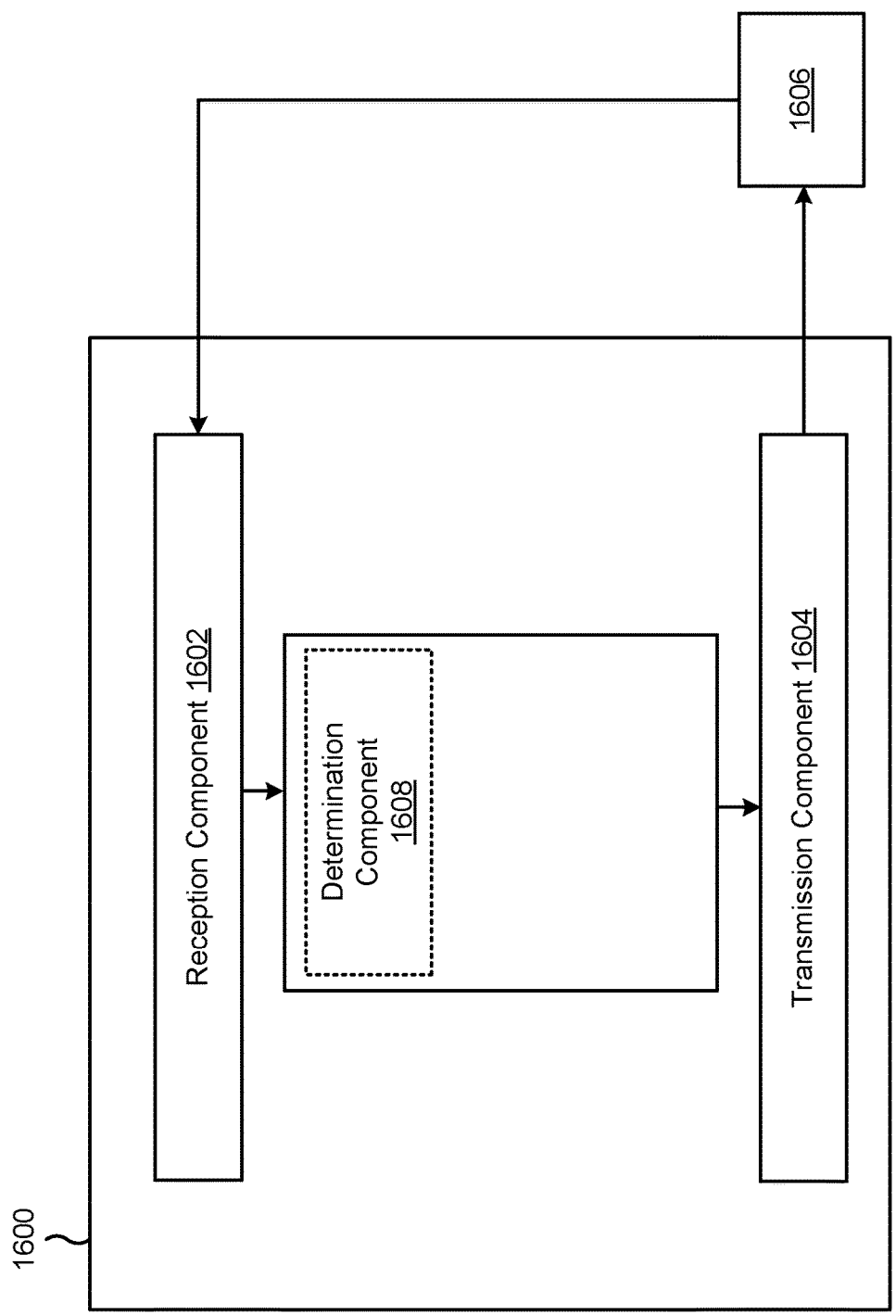
FIG. 16 is a block diagram of an example apparatus for wireless communication.

FIG. 16 is a block diagram of an example apparatus 1600 for wireless communication. The apparatus 1600 may be a UE, or a UE may include the apparatus 1600. In some aspects, the apparatus 1600 includes a reception component 1602 and a transmission component 1604, which may be in communication with one another (such as via one or more buses or one or more other components). As shown, the apparatus 1600 may communicate with another apparatus 1606 (such as a UE, a base station, or another wireless communication device) using the reception component 1602 and the transmission component 1604. As shown, the apparatus 1600 may include a determination component 1608, among other examples. The determination component 1608 may be implemented to determine if an action is triggered or configured, obtain information indicating where an action is triggered or configured, receive an indication that an action is triggered or configured, make a selection, or transmit information that triggers an action. The information may be handover information or measurement information.

In some aspects, the apparatus 1600 may be configured to perform one or more operations described herein in connection with FIGS. 1-9. Additionally, or alternatively, the apparatus 1600 may be configured to perform one or more processes described herein, such as process 1200 of FIG. 12. In some aspects, the apparatus 1600 or one or more components shown in FIG. 16 may include one or more components of the UE described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the UE described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the UE described above in connection with FIG. 2. In some aspects, the transmission component 1604 may be co-located with the reception component 1602 in a transceiver. In some aspects, the transmission component 1604 may be a component of a processing system. For example, a processing system of the apparatus 1600 may refer to a system including the various other components or subcomponents of the apparatus 1600.

The processing system of the apparatus 1600 may interface with other components of the apparatus 1600, and may process information received from other components (such as inputs or signals), output information to other components, etc. For example, a chip or modem of the apparatus 1600 may include a processing system, the reception component 1602 to receive or obtain information, and the transmission component 1604 to output, transmit or provide information. In some cases, the reception component 1602 may refer to an interface between the processing system of the chip or modem and a receiver, such that the apparatus 1600 may receive information or signal inputs, and the information may be passed to the processing system. In some cases, the transmission component 1604 may refer to an interface between the processing system of the chip or modem and a transmitter, such that the apparatus 1600 may transmit information output from the chip or modem. A person having ordinary skill in the art will readily recognize that the second interface also may obtain or receive information or signal inputs, and the first interface also may output, transmit or provide information.

The transmission component 1604 may indicate support of a DAPS handover from a source cell or source MCG to a target cell or target MCG. The transmission component 1604 may transmit to the source cell or source MCG on a first uplink carrier. The determination component 1608 may determine that the DAPS handover from the source cell or source MCG to the target cell or target MCG is triggered. The determination component 1608 may determine that the UE is configured to switch uplink transmission from the first uplink carrier to the second uplink carrier, and that the UE is to maintain, during the DAPS handover, uplink transmission on the first uplink carrier. The determination component 1608 may determine that the UE is not configured to switch uplink transmission from the first uplink carrier to the second uplink carrier. The transmission component 1604 may maintain, during the DAPS handover, uplink transmission on the first uplink carrier.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
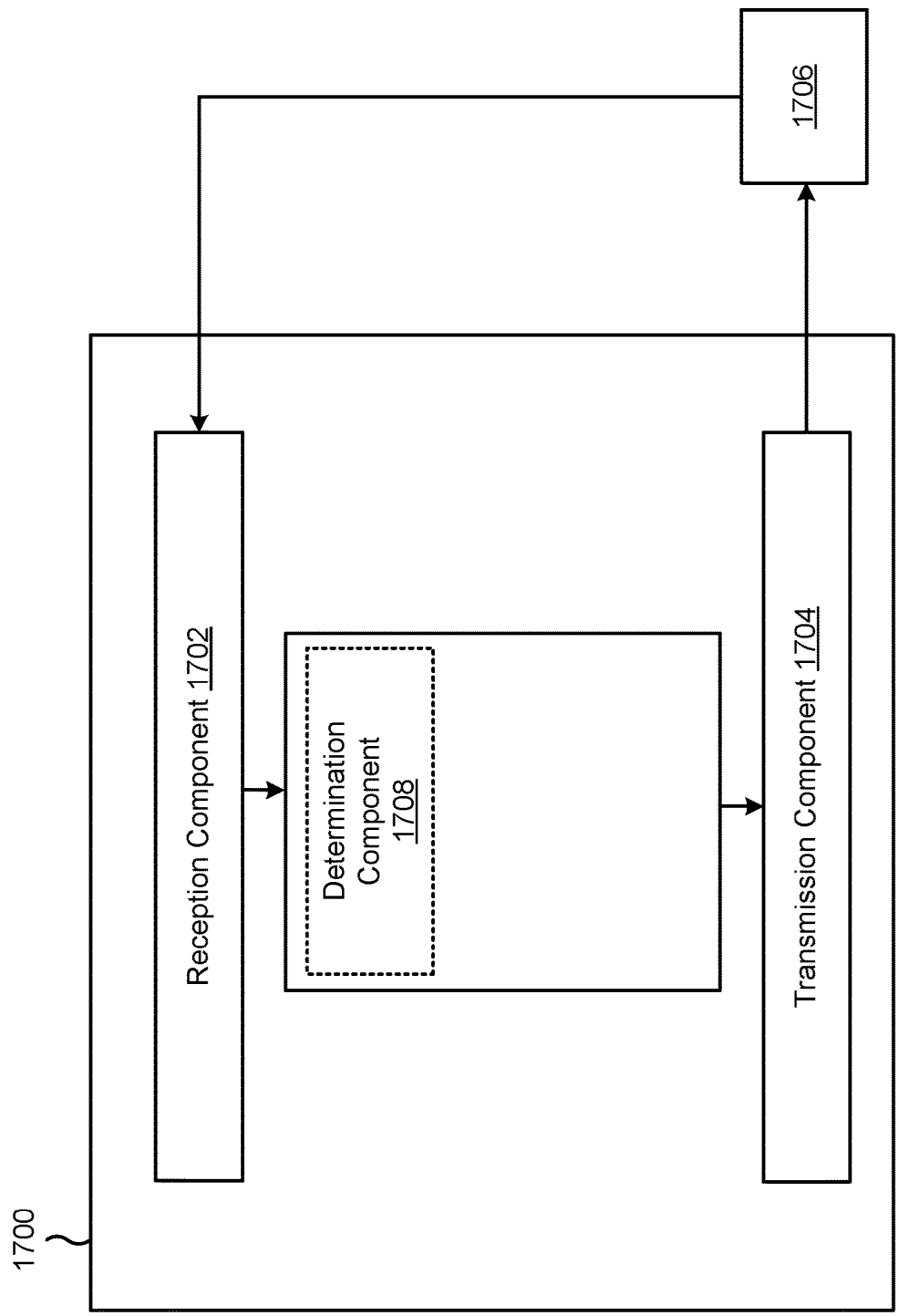
FIG. 17 is a block diagram of an example apparatus for wireless communication.

FIG. 17 is a block diagram of an example apparatus 1700 for wireless communication. The apparatus 1700 may be a base station, or a base station may include the apparatus 1700. In some aspects, the apparatus 1700 includes a reception component 1702 and a transmission component 1704, which may be in communication with one another (such as via one or more buses or one or more other components). As shown, the apparatus 1700 may communicate with another apparatus 1706 (such as a UE, a base station, or another wireless communication device) using the reception component 1702 and the transmission component 1704. As shown, the apparatus 1700 may include a determination component 1708, among other examples. The determination component 1708 may be implemented to determine if an action is configured, receive or obtain information indicating that an action is configured, make a selection, generate information, or transmit information that triggers an action.

In some aspects, the apparatus 1700 may be configured to perform one or more operations described herein in connection with FIGS. 1-9. Additionally, or alternatively, the apparatus 1700 may be configured to perform one or more processes described herein, such as process 1300 of FIG. 13. In some aspects, the apparatus 1700 or one or more components shown in FIG. 17 may include one or more components of the base station described above in connection with FIG. 2. Additionally, or alternatively, one or more components shown in FIG. 17 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a demodulator, a MIMO detector, a receive processor, a controller/processor, a memory, or a combination thereof, of the base station described above in connection with FIG. 2.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, or a combination thereof, of the base station described above in connection with FIG. 2. In some aspects, the transmission component 1704 may be co-located with the reception component 1702 in a transceiver. In some aspects, the transmission component 1704 may be a component of a processing system. For example, a processing system of the apparatus 1700 may refer to a system including the various other components or subcomponents of the apparatus 1700.

The processing system of the apparatus 1700 may interface with other components of the apparatus 1700, and may process information received from other components (such as inputs or signals), output information to other components, etc. For example, a chip or modem of the apparatus 1700 may include a processing system, the reception component 1702 to receive or obtain information, and the transmission component 1704 to output, transmit or provide information. In some cases, the reception component 1702 may refer to an interface between the processing system of the chip or modem and a receiver, such that the apparatus 1700 may receive information or signal inputs, and the information may be passed to the processing system. In some cases, the transmission component 1704 may refer to an interface between the processing system of the chip or modem and a transmitter, such that the apparatus 1700 may transmit information output from the chip or modem. A person having ordinary skill in the art will readily recognize that the second interface also may obtain or receive information or signal inputs, and the first interface also may output, transmit or provide information.

The reception component 1702 may receive an indication that a UE supports DAPS handover for intra-frequency handover of the UE. The determination component 1708 may generate one or more of a configuration or an instruction for a UE related to switching, during the DAPS handover, uplink transmission to a source cell or source MCG from a first uplink carrier to a second uplink carrier. The transmission component 1704 may transmit the one or more of a configuration or an instruction that the UE is able to switch uplink transmission to the source cell or source MCG between the first carrier and the second carrier and that the UE is to maintain, during the DAPS handover, uplink transmission on the first carrier.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, or not equal to the threshold.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a user equipment (UE), comprising:
   - transmitting an indication associated with the UE supporting a dual active protocol stack (DAPS) handover from a source cell or source master cell group (MCG) to a target cell or target MCG to the source cell;
   - transmitting on a normal uplink (NUL) to the source cell or source MCG in an active bandwidth part (BWP) for a NUL carrier;
   - transmitting on a supplementary uplink (SUL) to the source cell or source MCG in an active BWP for a SUL carrier; and
   - establishing, in association with the DAPS handover being triggered, an active uplink BWP on the target cell or target MCG that is within one or more of the active BWP for the SUL carrier or the active BWP for the NUL carrier.

2. The method of claim 1, wherein establishing the active uplink BWP includes the active uplink BWP on the target cell or target MCG being within the active BWP for the NUL carrier.

3. The method of claim 2, further comprising switching, during the DAPS handover, the active uplink BWP on the source cell or source MCG from the active BWP for the NUL carrier to the active BWP for the SUL carrier.

4. The method of claim 2, further comprising switching, during the DAPS handover, uplink transmission to the source cell or source MCG from the NUL carrier to the SUL carrier.

5. The method of claim 2, wherein the UE is not configured to switch uplink transmission from the NUL carrier to the SUL carrier.

6. The method of claim 2, further comprising:
maintaining, during the DAPS handover and when the UE is configured to switch uplink transmission from the NUL carrier to the SUL carrier, uplink transmission on the NUL carrier.

7. The method of claim 1, wherein establishing the active uplink BWP includes the active uplink BWP on the target cell or target MCG being within the active BWP for the SUL carrier.

8. The method of claim 7, further comprising switching, during the DAPS handover, the active uplink BWP on the target cell or target MCG from within the active BWP for the SUL carrier to within the active BWP for the NUL carrier.

9. The method of claim 7, further comprising switching, during the DAPS handover, uplink transmission to the source cell or source MCG from the SUL carrier to the NUL carrier.

10. The method of claim 7, wherein the UE is not configured to switch uplink transmission from the SUL carrier to the NUL carrier.

11. The method of claim 7, further comprising:
maintaining, during the DAPS handover and when the UE is configured to switch uplink transmission from the SUL carrier to the NUL carrier, uplink transmission on the SUL carrier.

12. The method of claim 1, wherein establishing the active uplink BWP is associated with a configuration or instruction indicating the active uplink BWP on the target cell or target MCG is to be one of within the active BWP for the SUL carrier or within the active BWP for the NUL carrier.

13. The method of claim 1, further comprising simultaneously transmitting, during the DAPS handover, one or more communications on the NUL to the source cell or source MCG and one or more communications on a NUL to the target cell or target MCG.

14. The method of claim 1, further comprising releasing, in association with the DAPS handover being triggered, the SUL carrier to the source cell or source MCG.

15. The method of claim 14, wherein the releasing of the SUL carrier is associated with receiving a release indication in a handover command or a dedicated radio resource control (RRC) message.

16. The method of claim 1, further comprising establishing a SUL to the target cell or target MCG in the active uplink BWP that is within one or more of the active BWP for the SUL carrier or the active BWP for the NUL carrier.

17. The method of claim 16, further comprising simultaneously transmitting, during the DAPS handover, one or more communications on the SUL to the source cell or source MCG and one or more communications on the SUL to the target cell or target MCG.

18. The method of claim 1, further comprising releasing, in association with the DAPS handover being triggered, the NUL carrier to the source cell or source MCG.

19. The method of claim 18, wherein the releasing of the NUL carrier is associated with receiving a release indication in a handover command or a dedicated radio resource control (RRC) message.

20. An apparatus of a user equipment (UE) for wireless communication, comprising:
a first interface configured to:
output an indication associated with the UE supporting a dual active protocol stack (DAPS) handover from a source cell or source master cell group (MCG) to a target cell or target MCG to the source cell;
output on a normal uplink (NUL) to the source cell or source MCG in an active bandwidth part (BWP) for a NUL carrier; and
output on a supplementary uplink (SUL) to the source cell or source MCG in an active BWP for a SUL carrier; and
a processing system configured to:
establish, in association with the DAPS handover being triggered, an active uplink BWP on the target cell or target MCG that is within one or more of the active BWP for the SUL carrier or the active BWP for the NUL carrier.

21. The apparatus of claim 20, wherein the active uplink BWP on the target cell or target MCG is within the active BWP for the NUL carrier.

22. The apparatus of claim 21, wherein the first interface is configured to maintain, during the DAPS handover and when the UE is configured to switch uplink transmission from the NUL carrier to the SUL carrier, uplink transmission on the NUL carrier.

23. The apparatus of claim 20, wherein the active uplink BWP on the target cell or target MCG is within the active BWP for the SUL carrier.

24. The apparatus of claim 23, wherein the first interface is configured to maintain, during the DAPS handover and when the UE is configured to switch uplink transmission from the NUL carrier to the SUL carrier, uplink transmission on the SUL carrier.

25. The apparatus of claim 20, wherein the second first interface is configured to release, in association with the DAPS handover being triggered, the SUL carrier to the source cell or source MCG, and wherein the release of the SUL carrier is associated with receiving a release indication in a handover command or a dedicated radio resource control (RRC) message.

26. The apparatus of claim 20, wherein the processing system is configured to establish a SUL to the target cell or target MCG in the active uplink BWP that is within one or more of the active BWP for the SUL carrier or the active BWP for the NUL carrier.

27. The apparatus of claim 20, wherein the first interface is configured to release, in association with the DAPS handover being triggered, the NUL carrier to the source cell or source MCG, and wherein the release of the NUL carrier is associated with obtaining a release indication in a handover command or a dedicated radio resource control (RRC) message.

28. A method of wireless communication performed by an apparatus of a user equipment (UE), comprising:
transmitting an indication associated with the UE supporting a dual active protocol stack (DAPS) handover from a source cell or source master cell group (MCG) to a target cell or target MCG to the source cell;

transmitting to the source cell or source MCG on a first uplink carrier; and maintaining, during the DAPS handover, uplink transmission on the first uplink carrier when, in association with the DAPS handover being triggered, the UE is configured to:
- switch the uplink transmission from the first uplink carrier to a second uplink carrier, and
- maintain, during the DAPS handover, the uplink transmission on the first uplink carrier.

29. The method of claim 28, wherein the first uplink carrier is a normal uplink carrier and the second uplink carrier is a supplementary uplink carrier.

30. The method of claim 28, wherein the second uplink carrier is a normal uplink carrier and the first uplink carrier uplink is a supplementary uplink carrier.

\* \* \* \* \*